(12) United States Patent
Hamano

(10) Patent No.: US 9,531,944 B2
(45) Date of Patent: Dec. 27, 2016

(54) FOCUS DETECTION APPARATUS AND CONTROL METHOD THEREOF

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 86 days.

(21) Appl. No.: 14/665,618

(22) Filed: Mar. 23, 2015

(65) Prior Publication Data
US 2015/0281556 A1   Oct. 1, 2015

(30) Foreign Application Priority Data

Mar. 26, 2014 (JP) ................................. 2014-063561
Jan. 9, 2015 (JP) ................................. 2015-003611

(51) Int. Cl.
*H04N 5/232* (2006.01)
*G02B 7/34* (2006.01)

(52) U.S. Cl.
CPC ............ *H04N 5/23212* (2013.01); *G02B 7/34* (2013.01)

(58) Field of Classification Search
CPC .............................. G02B 7/34; H04N 5/23212
See application file for complete search history.

(56) References Cited

U.S. PATENT DOCUMENTS

| | | | | |
|---|---|---|---|---|
| 9,377,601 B2* | 6/2016 | Kusaka | ..................... | G02B 7/34 |
| 2009/0284654 A1* | 11/2009 | Hori | .......................... | H03L 7/00 |
| | | | | 348/536 |
| 2010/0194967 A1* | 8/2010 | Amano | ..................... | G02B 7/34 |
| | | | | 348/345 |
| 2011/0076001 A1* | 3/2011 | Iwasaki | .................. | G03B 7/099 |
| | | | | 396/114 |
| 2011/0109775 A1* | 5/2011 | Amano | .............. | H04N 5/23212 |
| | | | | 348/241 |
| 2012/0293706 A1* | 11/2012 | Usui | ...................... | H04N 5/335 |
| | | | | 348/345 |
| 2013/0021519 A1* | 1/2013 | Hamada | ................. | G03B 13/36 |
| | | | | 348/349 |
| 2014/0022422 A1* | 1/2014 | Endo | .................. | H04N 5/23212 |
| | | | | 348/270 |

(Continued)

FOREIGN PATENT DOCUMENTS

JP    3592147 B2    11/2004
JP    2008-052009 A    3/2008

*Primary Examiner* — Amy Hsu
(74) *Attorney, Agent, or Firm* — Cowan, Liebowitz & Latman, P.C.

(57) ABSTRACT

A first phase difference between a first image signal output from a first pixel configured to detect a light flux having passed through a first partial area of the exit pupil, and a second image signal output from a third pixel configured to detect a light flux having passed through the entire exit pupil is computed. A second phase difference between a third image signal output from a second pixel configured to detect a light flux having passed through a second partial area of the exit pupil, and a fourth image signal output from a fourth pixel arranged at a position different from the third pixel and configured to detect a light flux having passed through the entire exit pupil is computed. The defocus amount of the imaging optical system is computed by using the sum of the first and second phase differences.

16 Claims, 10 Drawing Sheets

(56) References Cited

U.S. PATENT DOCUMENTS

2014/0168480 A1\* 6/2014 Okazawa ........... H04N 5/23212
          348/241
2014/0176780 A1\* 6/2014 Koshiba ................... G02B 7/34
          348/336

\* cited by examiner

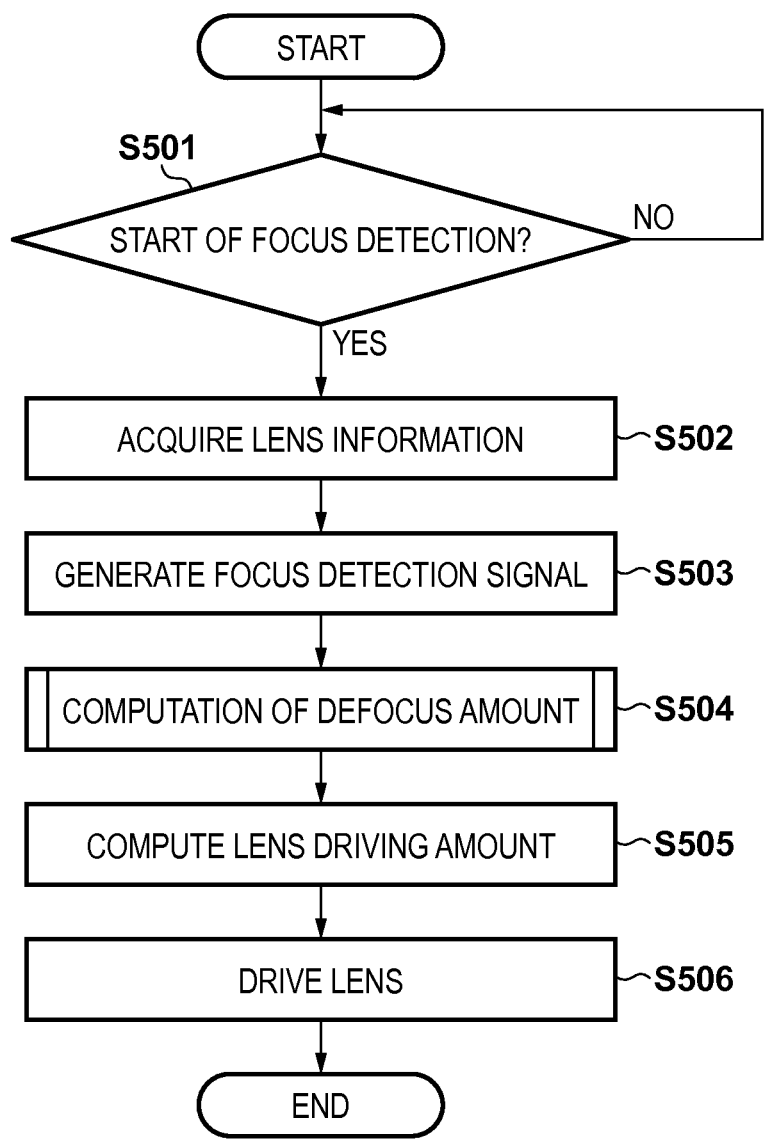

FOCUS DETECTION APPARATUS AND CONTROL METHOD THEREOF

BACKGROUND OF THE INVENTION

Field of the Invention

The present invention relates to a focus detection apparatus and a control method thereof and, more particularly, to a focus detection apparatus that performs phase-difference detection type focus detection based on an output from an image sensor, and a control method thereof.

Description of the Related Art

Japanese Patent Laid-Open No. 2008-52009 discloses a device that performs pupil-division type focus detection using an image sensor in which microlenses are formed in respective two-dimensionally arranged pixels. In this device, the photoelectric conversion unit of each pixel is divided into two areas where light fluxes having passed through different areas of the exit pupil of an imaging lens are received through the microlens. The phase difference (shift amount) between paired image signals is computed by performing correlation calculation on a pair of image signals generated from a plurality of pixels in every divided area. The defocus amount can be computed from the phase difference.

FIGS. 24 and 25 of Japanese Patent Laid-Open No. 2008-52009, and Japanese Patent No. 3592147 disclose image sensors in which some pixels are set as focus detection pixels for performing pupil-division type focus detection. Correction is necessary to use an output from the focus detection pixel as an output from a normal pixel. However, the number of signals read out as focus detection signals is smaller than in an arrangement in which the photoelectric conversion unit of each pixel is divided. Thus, the manufacturing cost of the image sensor and the calculation cost of signal processing can be suppressed.

In an arrangement using focus detection pixels, paired photoelectric conversion units that receive, via microlenses, light fluxes having passed through different areas of the exit pupil of an imaging lens are arranged in different pixels. That is, the positions of pixel groups used to generate a pair of image signals (A image and B image) for detecting a phase difference are different between the A image and the B image. Depending on the pattern of an object image, the degree of similarity between the A image and the B image may be low. In such a case, the focus detection accuracy degrades.

When the arrangement interval between focus detection pixels is large, the frequency component of the high-frequency band of an object optical image may not be acquired. Different folding noise components are generated in the A image and the B image, generating a focus detection error.

In an arrangement in which a plurality of photoelectric conversion units are arranged in each pixel, addition for generating a normal image signal is necessary in addition to readout from each photoelectric conversion unit, increasing the load of readout processing and calculation processing. The load may be reduced by performing readout of an output from one photoelectric conversion unit and addition readout of outputs from the two photoelectric conversion units, and generating an output from the other photoelectric conversion unit by subtraction. However, the subtraction generates an error, and there is a fear of degrading the phase difference detection accuracy.

SUMMARY OF THE INVENTION

The present invention is directed to solve at least one problem in the related art. More specifically, the present invention provides a focus detection apparatus capable of improving the accuracy of phase-difference detection type focus detection using an output from an image sensor, and a control method thereof.

According to an aspect of the present invention, there is provided a focus detection apparatus comprising: a first pixel configured to detect a light flux having passed through a partial area of an exit pupil of an imaging optical system; a second pixel configured to detect a light flux having passed through a partial area of the exit pupil of the imaging optical system that is different from the area through which the light flux detected by the first pixel has passed; a third pixel configured to detect a light flux having passed through an entire area of the exit pupil of the imaging optical system; a fourth pixel arranged at a position different from the third pixel and configured to detect a light flux having passed through the entire area of the exit pupil of the imaging optical system; a first computation unit configured to compute a first phase difference between a first image signal output from the first pixel, and a second image signal output from the third pixel; a second computation unit configured to compute a second phase difference between a third image signal output from the second pixel, and a fourth image signal output from the fourth pixel; and a defocus amount computation unit configured to compute a defocus amount of the imaging optical system by using a sum of the first phase difference and the second phase difference.

According to another aspect of the present invention, there is provided a focus detection apparatus comprising: a first pixel configured to detect a light flux having passed through a partial area of an exit pupil of an imaging optical system; a second pixel configured to detect a light flux having passed through a partial area of the exit pupil of the imaging optical system that is different from the area through which the light flux detected by the first pixel has passed; a third pixel arranged at a position closer to the first pixel than the second pixel and configured to detect a light flux having passed through an entire area of the exit pupil of the imaging optical system; a fourth pixel arranged at a position closer to the second pixel than the first pixel and configured to detect a light flux having passed through the entire area of the exit pupil of the imaging optical system; a first computation unit configured to compute a first phase difference between a first image signal output from the first pixel, and a second image signal output from the third pixel; a second computation unit configured to compute a second phase difference between a third image signal output from the second pixel, and a fourth image signal output from the fourth pixel; and a defocus amount computation unit configured to compute a defocus amount of the imaging optical system by using a sum of the first phase difference and the second phase difference.

According to a further aspect of the present invention, there is provided a focus detection apparatus comprising: a first pixel configured to detect a light flux having passed through an exit pupil of an imaging optical system, a barycentric position of a projection image of a pixel that is projected on the exit pupil being shifted from a barycentric position of the exit pupil in a first direction perpendicular to an optical axis; a second pixel configured to detect a light flux having passed through the exit pupil of the imaging optical system, a barycentric position of a projection image of a pixel that is projected on the exit pupil being shifted from the barycentric position of the exit pupil in a direction opposite to the first direction; a third pixel configured to detect a light flux having passed through the exit pupil of the imaging optical system, a barycentric position of a projection image of a pixel that is projected on the exit pupil being positioned at the barycentric position of the exit pupil; a fourth pixel arranged at a position different from the third pixel and configured to detect a light flux having passed through the exit pupil of the imaging optical system, a barycentric position of a projection image of a pixel that is projected on the exit pupil being positioned at the barycentric position of the exit pupil; a first computation unit configured to compute a first phase difference between a first image signal output from the first pixel, and a second image signal output from the third pixel; a second computation unit configured to compute a second phase difference between a third image signal output from the second pixel, and a fourth image signal output from the fourth pixel; and a defocus amount computation unit configured to compute a defocus amount of the imaging optical system by using a sum of the first phase difference and the second phase difference.

According to a yet further aspect of the present invention, there is provided a focus detection apparatus control method comprising: a first detection step of detecting a light flux having passed through a partial area of an exit pupil of an imaging optical system; a second detection step of detecting a light flux having passed through a partial area of the exit pupil of the imaging optical system that is different from the area through which the light flux detected in the first detection step; a third detection step of detecting a light flux having passed through an entire area of the exit pupil of the imaging optical system; a fourth detection step of detecting, at a position different from a position at which the third detection step detects the light flux, a light flux having passed through the entire area of the exit pupil of the imaging optical system; a first computation step of computing a first phase difference between a first image signal obtained in the first detection step, and a second image signal obtained in the third detection step; a second computation step of computing a second phase difference between a third image signal obtained in the second detection step, and a fourth image signal obtained in the fourth detection step; and a defocus amount computation step of computing a defocus amount of the imaging optical system by using a sum of the first phase difference and the second phase difference.

According to another aspect of the present invention, there is provided a focus detection apparatus control method comprising: a first detection step of detecting a light flux having passed through a partial area of an exit pupil of an imaging optical system; a second detection step of detecting a light flux having passed through a partial area of the exit pupil of the imaging optical system that is different from the area through which the light flux detected in the first detection step has passed; a third detection step of detecting, at a position, a distance from which to a position at which the first detection step detects the light flux is shorter than that to a position at which the second detection step detects the light flux, a light flux having passed through an entire area of the exit pupil of the imaging optical system, the third detection step being arranged at a position closer to the first detection step than the second detection step; a fourth detection step of detecting, at a position, a distance from which to a position at which the second detection step detects the light flux is shorter than that to a position at which the first detection step detects the light flux, a light flux having passed through the entire area of the exit pupil of the imaging optical system, the fourth detection step being arranged at a position closer to the second detection step than the first detection step; a first computation step of computing a first phase difference between a first image signal obtained in the first detection step, and a second image signal obtained in the third detection step; a second computation step of computing a second phase difference between a third image signal obtained in the second detection step, and a fourth image signal obtained in the fourth detection step; and a defocus amount computation step of computing a defocus amount of the imaging optical system by using a sum of the first phase difference and the second phase difference.

According to another aspect of the present invention, there is provided a focus detection apparatus control method comprising: a first computation step of computing a first phase difference between a first image signal output from a first pixel configured to detect a light flux having passed through an exit pupil of an imaging optical system, a barycentric position of a projection image of a pixel that is projected on the exit pupil being shifted from a barycentric position of the exit pupil in a first direction perpendicular to an optical axis, and a second image signal output from a third pixel configured to detect a light flux having passed through the exit pupil of the imaging optical system, a barycentric position of a projection image of a pixel that is projected on the exit pupil being positioned at the barycentric position of the exit pupil; a second detection step of computing a second phase difference between a third image signal output from a second pixel configured to detect a light flux having passed through the exit pupil of the imaging optical system, a barycentric position of a projection image of a pixel that is projected on the exit pupil being shifted from the barycentric position of the exit pupil in a direction opposite to the first direction, and a fourth image signal output from a fourth pixel arranged at a position different from the third pixel and configured to detect a light flux having passed through the exit pupil of the imaging optical system, a barycentric position of a projection image of a pixel that is projected on the exit pupil being positioned at the barycentric position of the exit pupil; and a defocus amount computation step of computing a defocus amount of the imaging optical system by using a sum of the first phase difference and the second phase difference.

Further features of the present invention will become apparent from the following description of exemplary embodiments with reference to the attached drawings.

BRIEF DESCRIPTION OF THE DRAWINGS

FIG. 5 is a flowchart showing a focus adjustment operation according to the embodiment;

DESCRIPTION OF THE EMBODIMENTS

Exemplary embodiments of the present invention will now be described in detail in accordance with the accompanying drawings.

First Embodiment

Figure 1:
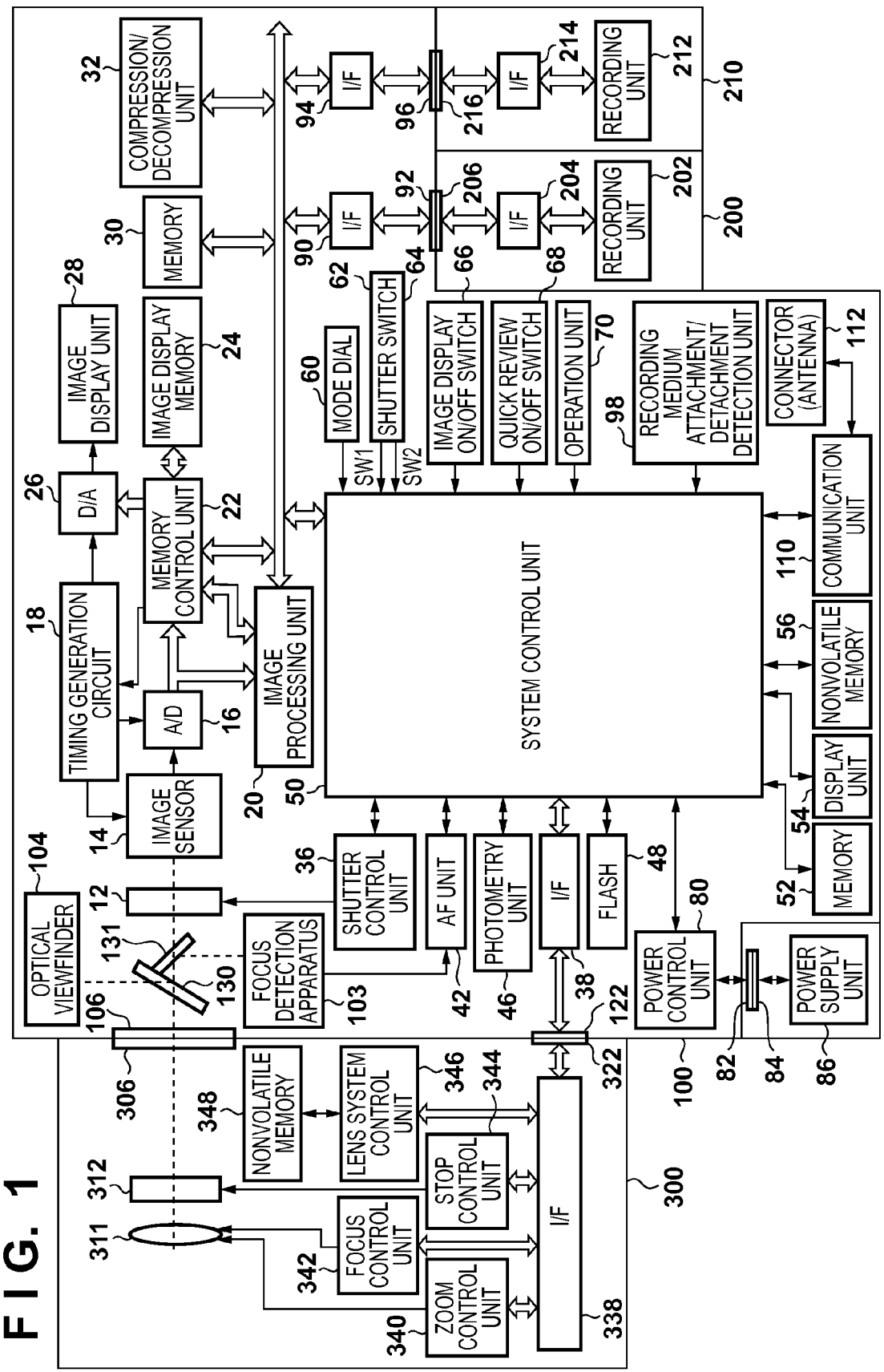
FIG. 1 is a block diagram showing an example of the functional arrangement of a camera system as an example of an image capture apparatus including a focus detection apparatus according to an embodiment.

FIG. 1 is a block diagram showing an example of the arrangement of a camera system constituted by an imaging lens and a camera capable of interchanging an imaging lens, as an example of an image capture apparatus including a focus detection apparatus according to an embodiment of the present invention. Referring to FIG. 1, the camera system includes a camera 100 and an interchangeable imaging lens 300.

A light flux having passed through the imaging lens 300 passes through a lens mount 106, is reflected upward by a main mirror 130, and enters an optical viewfinder 104. The user can shoot an image while observing an object optical image through the optical viewfinder 104. Some functions of a display unit 54, for example, focus display, camera shake warning display, f-number display, and exposure correction display are set in the optical viewfinder 104.

Part of the main mirror 130 is formed from a semi-transmissive half mirror. Part of a light flux entering the main mirror 130 passes through the half mirror portion, is reflected downward by a sub-mirror 131, and enters a focus detection apparatus 103. The focus detection apparatus 103 is a phase-difference detection type focus detection apparatus including a secondary imaging optical system and a line sensor. The focus detection apparatus 103 outputs a pair of image signals to an AF unit (Auto Focus unit) 42. The AF unit 42 performs phase difference detection calculation on the pair of image signals, and obtains the defocus amount and direction of the imaging lens 300. Based on this calculation result, a system control unit 50 performs control such as focus adjustment processing on a focus control unit 342 (to be described later) of the imaging lens 300. In this embodiment, the AF unit 42 performs even correction of a focus detection result.

When focus adjustment processing of the imaging lens 300 ends and still image shooting is performed, when electronic viewfinder display is performed, or when moving image shooting is performed, a quick return mechanism (not shown) moves the main mirror 130 and the sub-mirror 131 out of the optical path. Then, a light flux that has passed through the imaging lens 300 and enters the camera 100 can enter an image sensor 14 through a shutter 12 for controlling the exposure amount. After the end of the shooting operation by the image sensor 14, the main mirror 130 and the sub-mirror 131 return to positions as shown in FIG. 1.

The image sensor 14 is a CCD or CMOS image sensor, and has an arrangement in which a plurality of pixels are two-dimensionally arranged. The image sensor 14 photoelectrically converts an object optical image for each pixel, and outputs an electrical signal. The electrical signal photoelectrically converted by the image sensor 14 is sent to an A/D converter 16, and is converted from an analog signal output into a digital signal (image data). A timing generation circuit 18 supplies a clock signal and a control signal to the image sensor 14, the A/D converter 16, and a D/A converter 26. A memory control unit 22 and the system control unit 50 control the timing generation circuit 18. An image processing unit 20 applies predetermined processes such as pixel interpolation processing, white balance adjustment processing, and color conversion processing to image data from the A/D converter 16 or image data from the memory control unit 22.

Some pixels of the image sensor 14 according to this embodiment are constituted as focus detection pixels, and enable phase-difference detection type focus detection even in a state in which the quick return mechanism moves the main mirror 130 and the sub-mirror 131 out of the optical path. Of image data obtained by the image sensor 14, pixel data used for generating a focus detection signal is converted into focus detection data by the image processing unit 20. After that, the focus detection data is sent to the AF unit 42 via the system control unit 50, and the AF unit 42 performs focus adjustment of the imaging lens 300 based on the focus detection data.

Note that contrast type AF is also possible, in which the image processing unit 20 calculates a contrast evaluation value from image data obtained by shooting by the image sensor 14, and the system control unit 50 performs focusing for the focus control unit 342 of the imaging lens 300. In this manner, the camera 100 according to this embodiment is capable of both phase-difference detection type AF and contrast type AF from image data obtained by the image sensor 14 even if the main mirror 130 and the sub-mirror 131 move out of the optical path as in live view display or moving image shooting. The camera 100 according to this embodiment is capable of phase-difference detection type AF by the focus detection apparatus 103 in normal still image shooting in which the main mirror 130 and the sub-mirror 131 exist in the optical path. Hence, focus adjustment is possible in all the states of still image shooting, live view display, and moving image shooting.

The memory control unit 22 controls the A/D converter 16, the timing generation circuit 18, the image processing unit 20, an image display memory 24, the D/A converter 26, a memory 30, and a compression/decompression unit 32. Data of the A/D converter 16 is written in the image display memory 24 or the memory 30 via the image processing unit 20 and the memory control unit 22 or via only the memory control unit 22. Display image data written in the image display memory 24 is displayed on an image display unit 28 formed from a liquid crystal monitor or the like via the D/A converter 26. An electronic viewfinder function (live view display or through display) can be implemented by sequentially displaying moving images shot by the image sensor 14 on the image display unit 28. The image display unit 28 can turn on/off the display in accordance with an instruction from the system control unit 50. When the display is turned off, the power consumption of the camera 100 can be greatly reduced.

The memory 30 is used to temporarily store shot still images and moving images, and has a storage capacity enough to store a predetermined number of still images or a moving image of a predetermined time. Even in continuous shooting or panoramic shooting, high-speed, large-amount image write can be performed on the memory 30. The memory 30 can also be used as the work area of the system control unit 50. The compression/decompression unit 32 has a function of compressing/decompressing image data by adaptive discrete cosine transform (ADCT) or the like. The compression/decompression unit 32 loads an image stored in the memory 30, performs compression processing or decompression processing, and writes back the processed image data in the memory 30.

A shutter control unit 36 controls the shutter 12 in cooperation with a stop control unit 344 that controls a stop 312 of the imaging lens 300 based on photometry information from a photometry unit 46. An interface unit 38 and a connector 122 electrically connect the camera 100 and the imaging lens 300. The interface unit 38 and the connector 122 transmit a control signal, status signal, data signal, and the like between the camera 100 and the imaging lens 300, and also have a function of supplying currents of various voltages. The interface unit 38 and the connector 122 may also be configured to perform not only electrical communication but also optical communication, speech communication, and the like.

The photometry unit 46 performs auto exposure control (AE) processing. A light flux having passed through the imaging lens 300 is caused to enter the photometry unit 46 through a lens mount 106, the main mirror 130, and a photometry lens (not shown), and the brightness of an object optical image can be measured. The photometry unit 46 can decide an exposure condition by using, for example, a program chart that associates a brightness value and an exposure condition. The photometry unit 46 also has a light control processing function in cooperation with a flash 48. Note that the system control unit 50 can also perform AE control on the shutter control unit 36 and the stop control unit 344 of the imaging lens 300 based on a calculation result of calculating image data of the image sensor 14 by the image processing unit 20. The flash 48 also has an AF auxiliary light projection function and a flash control function.

The system control unit 50 includes a programmable processor such as a CPU or MPU, and controls the operation of the overall camera system by executing a program stored in advance. A nonvolatile memory 52 stores constants, variables, programs, and the like for the operation of the system control unit 50. The display unit 54 is, for example, a liquid crystal display device that displays an operation state, message, and the like by using a text, image, sound, and the like in accordance with execution of a program by the system control unit 50. One or a plurality of display units 54 are installed at easy-to-see positions near the operation unit of the camera 100, and are constituted by, for example, a combination of LCDs, LEDs, or the like. Of the display contents of the display unit 54, those displayed on the LCD or the like are information about the number of shooting images such as the number of recorded images or the remaining number of shootable images, and information about shooting conditions such as the shutter speed, f-number, exposure correction, and flash. In addition, the remaining battery level, date & time, and the like are also displayed. As described above, some functions of the display unit 54 are installed in the optical viewfinder 104.

A nonvolatile memory 56 is an electrically erasable/programmable memory, and an EEPROM or the like is used. Operation units 60, 62, 64, 66, 68, and 70 are used to input various operation instructions of the system control unit 50, and each operation unit is constituted by one or a combination of a switch, dial, light-of-sight detection type pointing, and speech recognition device.

The mode dial 60 can switch and set each of function modes such as power off, auto shooting mode, manual shooting mode, playback mode, and PC connection mode.

When a shutter button (not shown) is pressed halfway, the shutter switch SW1 62 is turned on and designates the start of an operation such as AF processing, AE processing, AWB processing, or EF processing. When the shutter button (not shown) is pressed fully, the shutter switch SW2 64 is turned on and designates the start of the operation of a series of processes regarding shooting. The series of processes regarding shooting includes exposure processing, development processing, and recording processing. In exposure processing, a signal read out from the image sensor 14 is written as image data in the memory 30 via the A/D converter 16 and the memory control unit 22. In development processing, development using calculation in the image processing unit 20 or the memory control unit 22 is performed. In recording processing, image data is read out from the memory 30, compressed by the compression/decompression unit 32, and written as image data in a recording medium 200 or 210.

The image display ON/OFF switch 66 can set ON/OFF of the image display unit 28. This function can implement power saving by stopping power supply to the image display unit 28 formed from a liquid crystal monitor or the like at the time of shooting using the optical viewfinder 104. The quick review ON/OFF switch 68 sets a quick review function of automatically playing back shot image data immediately after shooting. The operation unit 70 includes various buttons, a touch panel, and the like. These buttons include a menu button, a flash setting button, a single shooting/continuous shooting/self-timer switching button, and an exposure correction button.

A power control unit 80 is constituted by, for example, a battery detection circuit, a DC/DC converter, a switching circuit that switches a block to be energized. The power control unit 80 detects whether a battery has been mounted, the type of battery, and the remaining battery level. In accordance with the detection result and an instruction from the system control unit 50, the power control unit 80 controls the DC/DC converter to supply necessary voltages to respective units including a recording medium for necessary periods. Connectors 82 and 84 connect the camera 100 to a power supply unit 86 formed from a primary battery such as an alkaline battery or lithium battery, a secondary battery such as a NiCd battery, NiMH battery, or lithium ion battery, or an AC adaptor.

Interfaces 90 and 94 have a connection function with a recording medium such as a memory card or a hard disk. Connectors 92 and 96 perform physical connection with a recording medium such as a memory card or a hard disk. A recording medium attachment/detachment detection unit 98 detects whether a recording medium has been attached to the connector 92 or 96. This embodiment explains interfaces and connectors of two systems for attaching a recording medium. However, the number of systems of interfaces and connectors is arbitrary such as one or plural. Also, interfaces and connectors of different standards may be combined. By connecting various communication cards such as a LAN card to interfaces and connectors, image data and management information accessory to the image data can be transferred between a computer and another peripheral device such as a printer.

A communication unit 110 has various communication functions such as wired communication and wireless communication. A connector 112 connects the camera 100 to another device via the communication unit 110, and is an antenna in the case of wireless communication. The recording media 200 and 210 are memory cards, hard disks, or the like. The recording media 200 and 210 include recording units 202 and 212 constituted by semiconductor memories, magnetic memories, or the like, interfaces 204 and 214 with the camera 100, and connectors 206 and 216 that connect the camera 100.

Next, the imaging lens 300 will be explained. The imaging lens 300 is mechanically and electrically connected to the camera 100 by engaging a lens mount 306 with the lens mount 106 of the camera 100. The electrical connection is implemented by the connector 122 and a connector 322 that are arranged in the lens mounts 106 and 306, respectively. A lens 311 includes a focus lens for adjusting the in-focus distance of the imaging lens 300. A focus control unit 342 performs focus adjustment of the imaging lens 300 by driving the focus lens along the optical axis. The stop 312 adjusts the amount and angle of object light entering the camera 100.

The connector 322 and an interface 338 electrically connect the imaging lens 300 to the connector 122 of the camera 100. The connector 322 transmits a control signal, status signal, data signal, and the like between the camera 100 and the imaging lens 300, and also has a function of receiving currents of various voltages. The connector 322 may also be configured to perform not only electrical communication but also optical communication, speech communication, and the like.

A zoom control unit 340 adjusts the focal distance (angle of view) of the imaging lens 300 by driving the zoom lens of the lens 311. When the imaging lens 300 is a fixed focus lens, the zoom control unit 340 is not arranged. Based on photometry information from the photometry unit 46, the stop control unit 344 controls the stop 312 in cooperation with the shutter control unit 36 that controls the shutter 12.

A lens system control unit 346 includes a programmable processor such as a CPU or MPU, and controls the operation of the overall imaging lens 300 by executing a program stored in advance. The lens system control unit 346 has the function of a memory that stores constants, variables, programs, and the like for the operation of the imaging lens. A nonvolatile memory 348 stores identification information such as an imaging lens-specific number, management information, function information such as a full-aperture f-number, minimum f-number, and focal distance, present and past setting values, and the like.

In this embodiment, lens frame information corresponding to the state of the imaging lens 300 is also stored. The lens frame information includes information of the radius of a frame opening that decides a light flux passing through the imaging lens, and information of a distance from the image sensor 14 to the frame opening. The stop 312 is included in the frame that decides a light flux passing through the imaging lens. In addition, the opening of a lens frame component that holds the lens is equivalent to the frame. Since the frame that decides a light flux passing through the imaging lens changes depending on the focus position and zoom position of the lens 311, pieces of lens frame information are prepared in correspondence with focus positions and zoom positions of the lens 311. When the camera 100 performs focus detection using the focus detection apparatus, optimal lens frame information corresponding to the focus position and zoom position of the lens 311 is selected and sent to the camera 100 via the connector 322.

The arrangement of the camera system constituted by the camera 100 and the imaging lens 300 according to this embodiment has been described above.

Next, a phase-difference detection type focus detection operation using the image sensor 14 will be explained.

Figure 2A:
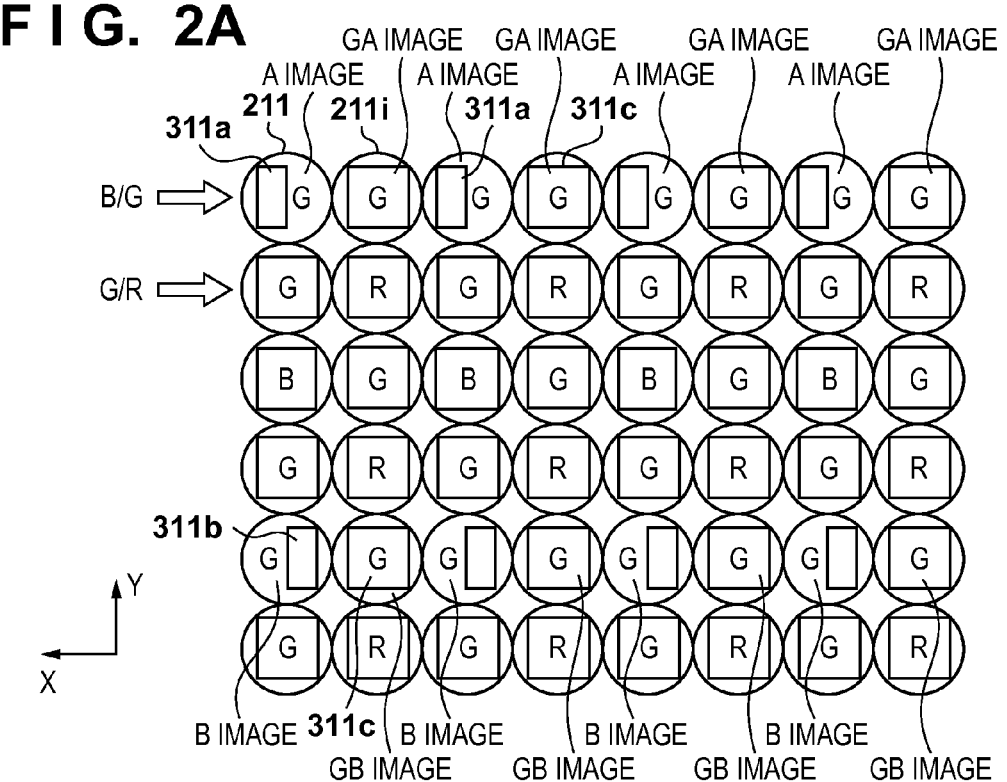
FIGS. 2A and 2B are views showing an example of the arrangement of an image sensor according to the first embodiment.

FIG. 2A is a view schematically showing an example of the pixel array of the image sensor 14 according to this embodiment. FIG. 2A shows a state in which a range of 6 rows in the longitudinal direction (Y-axis direction)×8 columns in the lateral direction (X-axis direction), out of pixels two-dimensionally arranged on the CMOS image sensor, is observed from the imaging lens 300. The image sensor 14 has color filters of a Bayer pattern. Green and red color filters are alternately arranged sequentially from left in pixels of even-numbered rows, and blue and green color filters are alternately arranged sequentially from left in pixels of odd-numbered rows. However, in the image sensor 14 according to this embodiment, green color filters are arranged instead of original blue color filters in pixels having focus detection photoelectric conversion units. In the following description, a pixel having a blue (or green or red) color filter will be sometimes called a blue pixel (or green pixel or red pixel).

On-chip microlenses 211i are arranged in respective pixels, and respective rectangles in the on-chip microlenses 211i schematically indicate the light receiving areas of the photoelectric conversion units. Focus detection photoelectric conversion units 311a and 311b are arranged by localizing them in lateral directions from the centers of pixels. In the following description, pixels having the focus detection photoelectric conversion units 311a and 311b will be sometimes called focus detection pixels. The focus detection photoelectric conversion units 311a and 311b are arranged in green pixels arranged instead of original blue pixels. This is because an output from the blue pixel has a lowest degree of influence on the image quality. Note that the present invention does not depend on the pattern of the color filters of the image sensor. In this manner, each of pixels including focus detection pixels in the image sensor 14 according to this embodiment includes one photoelectric conversion unit, so one output (photoelectric conversion signal) is read out from one pixel.

Generation of image signals used for phase-difference detection type focus detection will be explained. In this embodiment, four types of image signals are generated. In this embodiment, the exit pupil of the imaging optical system (imaging lens 300) is divided using the microlenses 211i and the photoelectric conversion units 311a and 311b different in localized position, which will be described later. An A image is an image signal organized by concatenating outputs from the plurality of photoelectric conversion units 311a among outputs from pixels 211 arranged on the same pixel row (X-axis direction). A B image is an image signal organized by concatenating outputs from the plurality of photoelectric conversion units 311b. As shown in FIG. 2A, the A image and the B image can be obtained from (green pixels at) a plurality of blue pixel positions adjacent at a two-pixel pitch in the X-axis direction.

A GA image is an image signal organized by concatenating outputs from photoelectric conversion units 311c of a plurality of green pixels adjacent to the photoelectric conversion units 311a in the X-axis direction in FIG. 2A. A GB image is an image signal organized by concatenating outputs from the photoelectric conversion units 311c of a plurality of green pixels adjacent to the photoelectric conversion units 311b in the X-axis direction in FIG. 2A. The photoelectric conversion units 311a and 311b output signals based on a light flux having passed through a partial area of the exit pupil of the imaging optical system (imaging lens 300). In contrast, the photoelectric conversion unit 311c outputs a signal based on a light flux having passed through the entire area of the exit pupil of the imaging optical system (imaging lens 300). High-accuracy phase difference detection is possible by obtaining the A image, B image, GA image, and GB image from pixel groups of the same color in this way.

Assume that the positions and numbers of pixels used to generate the A image, B image, GA image, and GB image are determined in accordance with the focus detection area.

The focus difference, that is, defocus amount of a predetermined area can be detected by detecting, by correlation calculation, a relative phase difference between the A image and the GA image generated in this fashion, and a relative phase difference between the B image and the GB image. In this embodiment, normal pixel signals are obtained from pixels (sometimes referred to as "imaging pixels" hereinafter) having the photoelectric conversion units 311c whose positions are not localized from the centers of the pixels. When generating a shot image, normal pixel signals at positions corresponding to the focus detection pixels are generated (complemented) using outputs from surrounding pixels. When generating a normal pixel signal, an output from a target focus detection pixel may or may not be used.

A plurality of pixels in which the photoelectric conversion units 311a used to generate the A image (first image signal) are arranged will be referred to as the first pixel group. A plurality of pixels in which the photoelectric conversion units 311b used to generate the B image (second image signal) are arranged will be referred to as the second pixel group. A plurality of pixels in which the photoelectric conversion units 311c used to generate the GA image (third image signal) are arranged will be referred to as the third pixel group. A plurality of pixels in which the photoelectric conversion units 311c used to generate the GB image (fourth image signal) are arranged will be referred to as the fourth pixel group.

In this embodiment, the third and fourth pixel groups are pixel groups adjacent to the first and second pixel groups in the X-axis direction. However, the third and fourth pixel groups may be pixel groups adjacent to the first and second pixel groups in the Y-axis direction. Alternatively, the GA image and the GB image may be generated using pixel values obtained from other pixels. For example, the GA image may be generated from a pixel value computed as the average value of a plurality of (for example, four) adjacent pixels for each pixel of the first pixel group.

Basically, the effects of the present invention are obtained by selecting the third pixel group so that the distance between the first and third pixel groups becomes smaller than the distance between the first and second pixel groups in a direction perpendicular to the phase difference detection direction. Similarly, the fourth pixel group is selected so that the distance between the second and fourth pixel groups becomes smaller than the distance between the first and second pixel groups. When the pixel values of the third and fourth pixel groups are generated from other pixel values, the virtual pixel positions of the respective pixels of the third and fourth pixel groups may be selected in the same way.

Figure 2B:
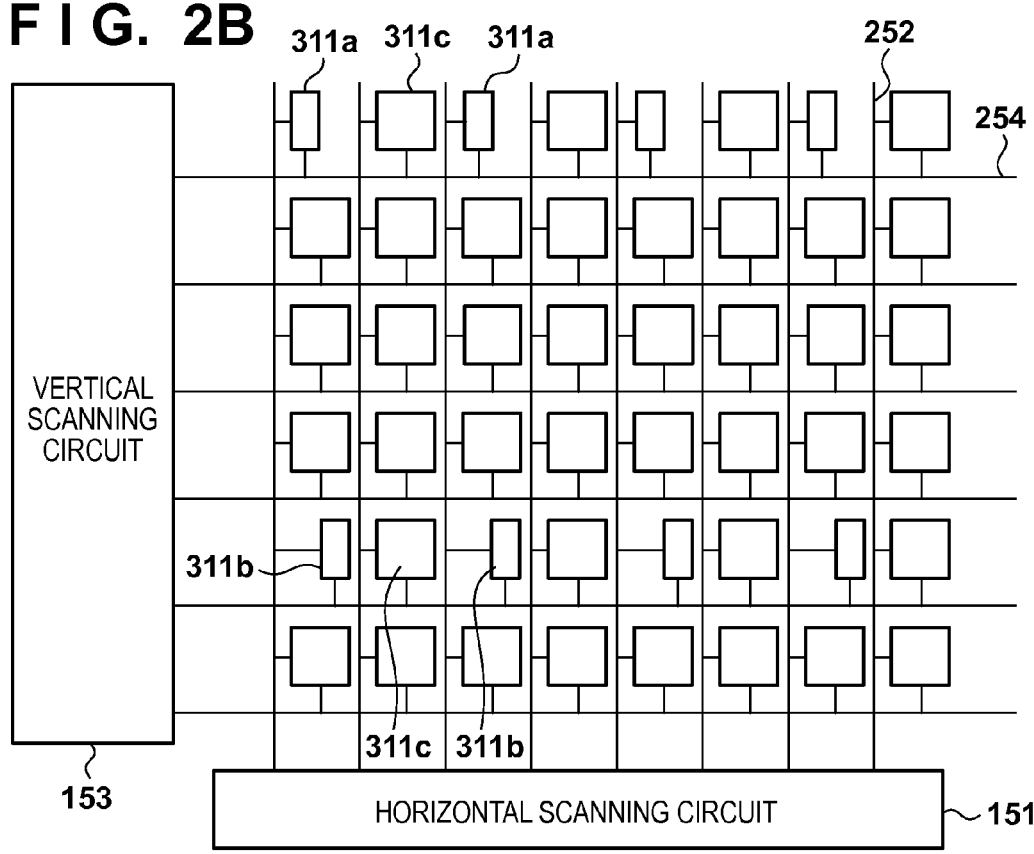

FIG. 2B is a view showing an example of the arrangement of the readout circuit of the image sensor 14 according to this embodiment. The image sensor 14 includes a horizontal scanning circuit 151 and a vertical scanning circuit 153, and horizontal scanning lines 252 and vertical scanning lines 254 are arranged at boundaries between respective pixels. Signals generated by the photoelectric conversion units 311a, 311b, and 311c are externally read out via the horizontal scanning lines 252 and the vertical scanning lines 254.

Figure 3A:
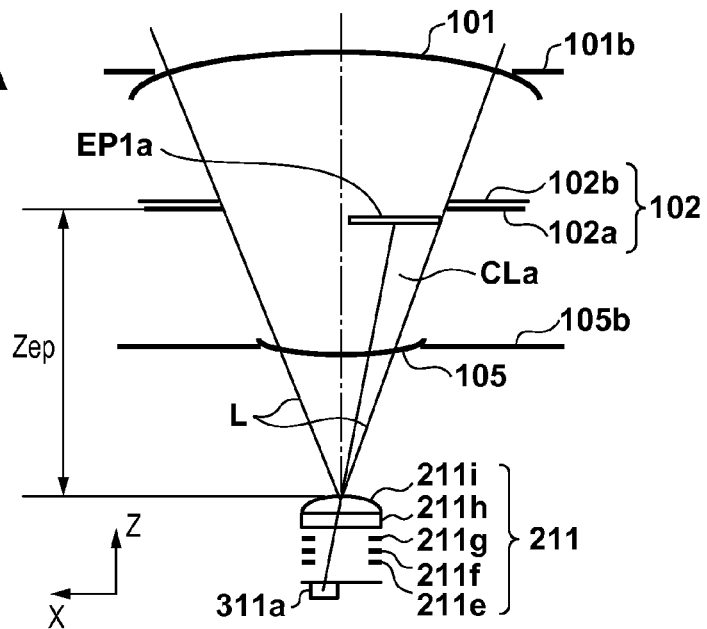
FIGS. 3A to 3C are views showing the relationship between the photoelectric conversion unit and the exit pupil according to the first embodiment.
Figure 3B:
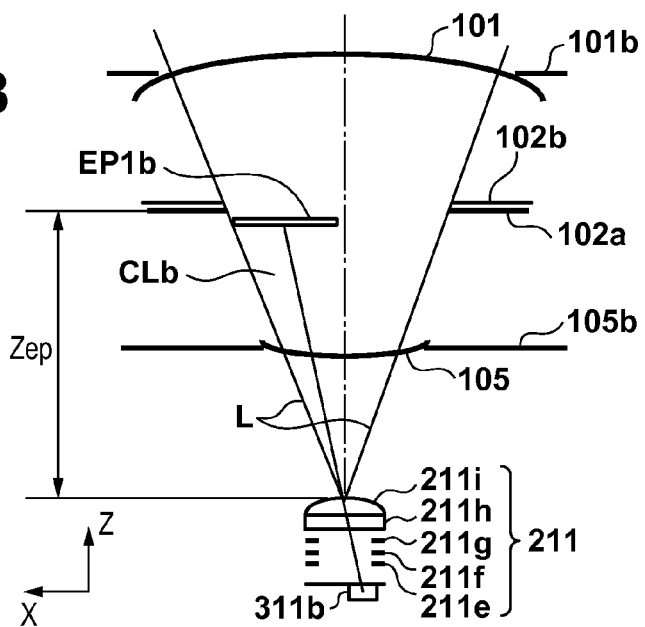
Figure 3C:
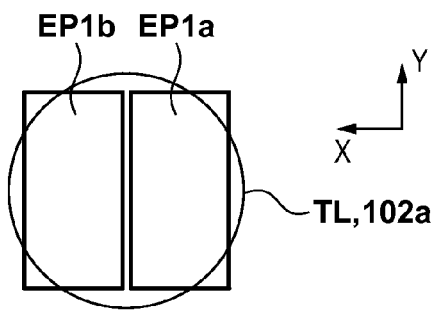

FIGS. 3A to 3C are views for explaining the conjugate relationship between the exit pupil plane of the imaging lens 300 and the photoelectric conversion units 311a and 311b of the pixels 211 arranged near the center of the image plane of the image sensor 14. The photoelectric conversion units 311a and 311b in the image sensor 14, and the exit pupil plane of the imaging lens 300 are designed to have a conjugate relationship by the on-chip microlens 211i. In general, the exit pupil plane of the imaging lens 300 almost coincides with a plane on which an iris diaphragm for adjusting the light amount is arranged.

The imaging lens 300 according to this embodiment is a zoom lens having the zooming function. In some zoom lenses, the size of the exit pupil, and the distance (exit pupil distance) from the image plane to the exit pupil change upon the zooming operation. FIGS. 3A to 3C show a state in which the focal distance of the imaging lens 300 exists at the center between the wide-angle end and the telephone end. An exit pupil distance Zep in this state is set as a standard value, and the shape of the on-chip microlens and a decentering parameter corresponding to the image height are optimally designed.

Referring to FIGS. 3A to 3C, the imaging lens 300 includes a first lens group 101, a lens barrel member 101b that holds the first lens group, a third lens group 105, and a lens barrel member 105b that holds the third lens group. Also, the imaging lens 300 includes a stop 102, an aperture plate 102a that defines an aperture diameter in the full-aperture state, and aperture blades 102b for adjusting the aperture diameter in the stopped-down-aperture state. In FIGS. 3A to 3C, the members 101b, 102a, 102b, and 105b acting as members to limit a light flux passing through the imaging lens 300 are illustrated as optical virtual images when observed from the image plane. A composite aperture near the stop 102 is defined as the exit pupil of the imaging lens 300, and has an exit pupil distance Zep.

The photoelectric conversion unit 311a (FIG. 3A), the photoelectric conversion unit 311b (FIG. 3B), or the photoelectric conversion unit 311c (not shown) is arranged on the lowermost layer of the pixel 211. Wiring layers 211e to 211g, a color filter 211h, and the on-chip microlens 211i are arranged on the upper layer of each of the photoelectric conversion units 311a to 311c. Each of the photoelectric conversion units 311a to 311c is projected onto the exit pupil plane of the imaging lens 300 through the on-chip microlens 211i. In other words, the exit pupil is projected onto the surface of each of the photoelectric conversion units 311a to 311c through the on-chip microlens 211i.

FIG. 3C shows projection images EP1a and EP1b of the photoelectric conversion units 311a and 311b on the exit pupil plane. Note that a projection image EP1c of the photoelectric conversion unit 311c is almost equal to the sum of EP1a and EP1b.

In FIGS. 3A and 3B, L represents the outermost portion of a light flux passing through the imaging lens 300. The outermost portion L of the light flux is restricted by the aperture plate 102a of the stop, and almost no eclipse is generated on the projection images EP1a and EP1b by the imaging lens 300. FIG. 3C shows a circle TL that is formed on the exit plane by the outermost portion L of the light flux in FIGS. 3A and 3B. Most part of the projection images EP1a and EP1b of the photoelectric conversion units 311a and 311b exists inside the circle TL. This also indicates that almost no eclipse is generated. Since the outermost portion L of the light flux is defined by the aperture plate 102a of the stop, the circle TL can be regarded as TL=102a. At this time, the eclipse state of each projection image EP1a or EP1b is symmetrical with respect to the optical axis at the center of the image plane, and the amounts of light received by the photoelectric conversion portions 311a and 311b are equal.

In this fashion, the image sensor 14 according to this embodiment has not only the shooting function, but also the function of a device that generates a signal used for phase-difference detection type focus detection.

Figure 4A:
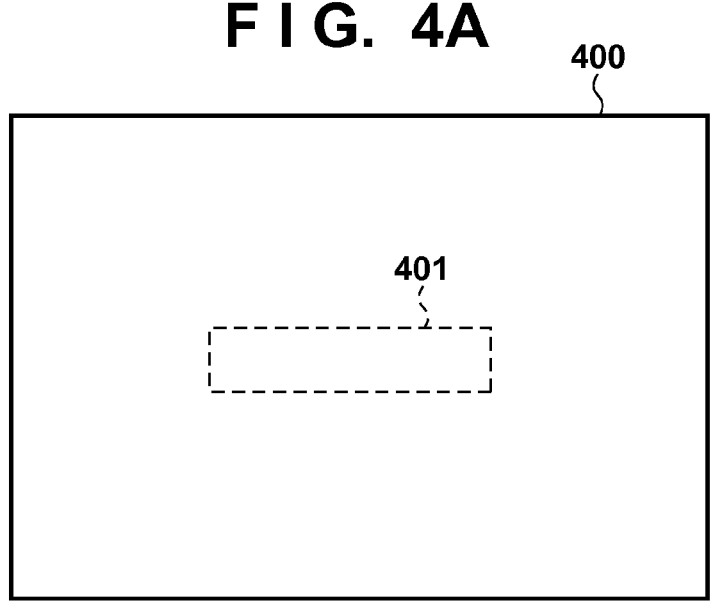
FIGS. 4A to 4C are views showing an example of the relationship between the focus detection area and pixels used for an AF signal according to the embodiment.

FIG. 4A is a view showing an example of a focus detection area 401 set in a shooting range 400. When focus detection using outputs from the pixels of the image sensor 14 is performed, outputs from pixels falling within an area of the image sensor 14 that corresponds to the focus detection area 401 are used in both the contrast detection method and the phase-difference detection method. It can therefore be considered that the focus detection area 401 is set in the image sensor 14. To facilitate the description and understanding, the focus detection area 401 will be explained as the pixel area of the image sensor 14.

Assume that the photoelectric conversion units 311a to 311c are arranged in pixels within the focus detection area 401 according to the rule as shown in FIG. 2A. Since focus detection pixels having the photoelectric conversion units 311a and 311b localized from the centers of the pixels in the horizontal (X-axis) direction, the phase difference of an image signal is detected from the horizontal contrast difference of an image in the focus detection area 401.

The phase difference detected here is generated from the difference between the traveling angles of paired light fluxes. The phase difference per unit defocus amount is proportional to the interval between the barycentric positions, in the area on the exit pupil plane, of light fluxes that generate a pair of image signals in the area on the exit pupil plane. As described above, the projection image EP1c corresponding to the photoelectric conversion unit 311c is almost equal to the sum of the projection images EP1a and EP1b. The barycentric position of the projection image EP1c exists at the center between the paired barycentric positions of the projection images EP1a and EP1b. For this reason, the phase difference between paired image signals (A image and B image) obtained from the photoelectric conversion units 311a and 311b is about double the phase difference between paired image signals (A image (B image) and GA image (GB image)) obtained from the photoelectric conversion units 311a (311b) and 311c. The barycentric position of the projection image EP1a is arranged on the right side of the barycentric position of the aperture plate 102a, and the barycentric position of the projection image EP1b is arranged on the left side.

Since the projection image EP1c is common to the GA image and the GB image, the barycentric position of a light flux that generates the GA image, and that of a light flux that generates the GB image are equal on the exit plane. The sum of the phase difference between the A image and the GA image obtained from outputs from the photoelectric conversion units 311a and 311c, and the phase difference between the B image and the GB image obtained from outputs from the photoelectric conversion units 311b and 311c is almost equal to the phase difference between the A image and the B image obtained from outputs from the photoelectric conversion units 311a and 311b.

Figure 4B:
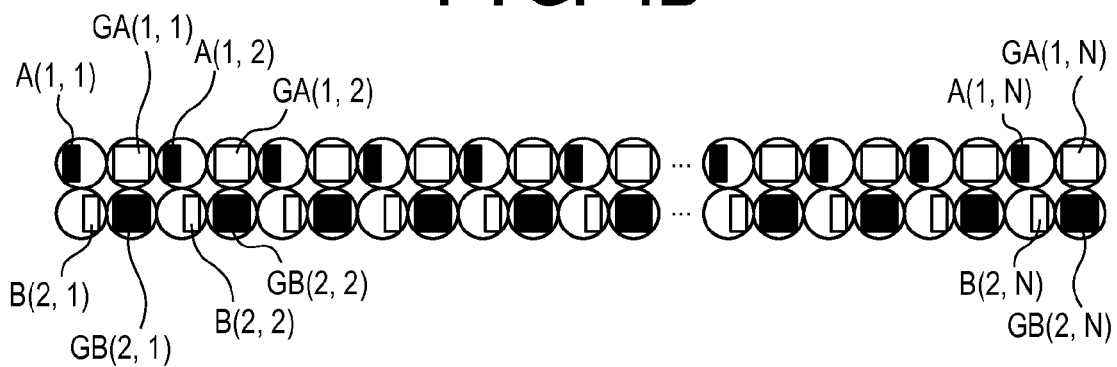

FIG. 4B is a view showing the type of image signal generated from an output from each pixel when pixels used to generate an AF image signal are extracted from pixels included in the focus detection area 401. Referring to FIG. 4B, the jth pixel on the ith row is represented by the "type of image signal" and (i, j) (i, j=integer of 1 to N) for each pixel group (each of the first to fourth pixel groups) that generates image signals of the same type. For example, the first pixel on the first row out of the first pixel group that generates the A image is represented by A(1, 1). In FIG. 4B, the photoelectric conversion units are classified by color in order to clarify a pixel group that generates image signals of the same type.

Note that FIG. 4B shows a case in which pixels of 2 rows×2N columns among pixels in the focus detection area 401 are used to generate an AF signal. However, the numbers of rows and columns are not limited to them. The number of rows suffices to be two or more. The number of columns is also properly set as long as a phase difference can be detected generally. When no phase difference can be detected or the accuracy is determined to be low, the number of columns may be dynamically increased.

Next, a focus adjustment operation in the camera 100 will be described with reference to a flowchart shown in FIG. 5. Note that processing shown in FIG. 5 is processing that is executed in a state in which the main mirror 130 and the sub-mirror 131 move out of the optical path (mirror-up), more specifically, at the time of live view display (at the time of moving image shooting for display) or at the time of moving image recording (at the time of moving image shooting for recording). In the following description, phase-difference detection type automatic focus detection using an output from the image sensor 14 is performed. However, contrast detection type automatic focus detection can also be performed, as described above.

In step S501, the system control unit 50 determines whether a focus detection start instruction has been input by an operation to the SW1 62, the operation unit 70, or the like. If the system control unit 50 determines that a focus detection start instruction has been input, it advances the process to step S502. If the system control unit 50 determines that no focus detection start instruction has been input, it waits. Note that the system control unit 50 may advance the process to step S502 in response to not only input of a focus detection start instruction but also the start of live view display or moving image recording.

In step S502, the system control unit 50 acquires, from the lens system control unit 346 via the interface units 38 and 338 and the connectors 122 and 322, various kinds of lens information such as lens frame information of the imaging lens 300 and the focus lens position.

In step S503, the system control unit 50 instructs the image processing unit 20 to generate AF image signals (A image, B image, GA image, and GB image) from pixel data in the focus detection area out of sequentially readout frame image data. The AF image signals are sent to the AF unit 42 and undergo for example, processing of correcting the difference between signal levels arising from the difference in the size of the photoelectric conversion unit between the focus detection pixel and the imaging pixel.

In step S504, the AF unit 42 computes an image difference by applying well-known correlation calculation or the like to two pairs of image signals of the A and GA images and the B and GB images, and converts the image difference into a defocus amount. Details of this processing will be described later. The AF unit 42 outputs the defocus amount to the system control unit 50.

In step S505, the system control unit 50 computes the lens driving amount of the imaging lens 300 based on the defocus amount obtained from the AF unit 42 in step S504.

In step S506, the system control unit 50 transmits information of the lens driving amount and driving direction to the focus control unit 342 of the imaging lens 300 via the interface units 38 and 338 and the connectors 122 and 322. The focus control unit 342 drives the focus lens based on the received information of the lens driving amount and driving direction, thereby performing focus adjustment of the imaging lens 300. Note that the operation in FIG. 5 may be continuously executed even when moving image data of the next and subsequent frames are read out.

Figure 6:
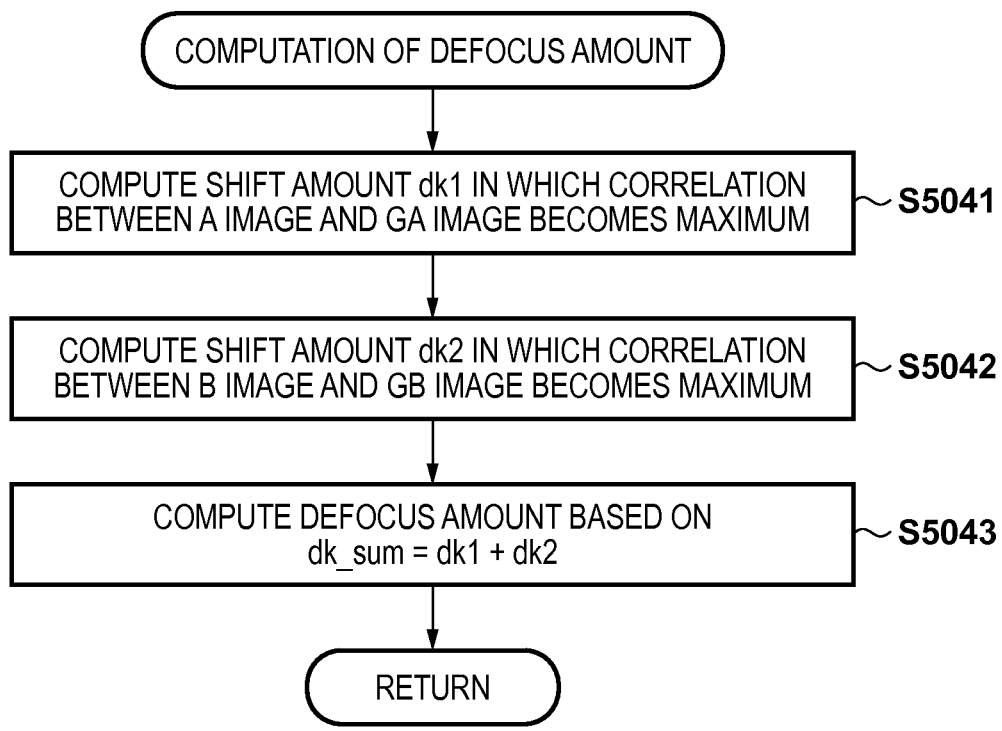
FIG. 6 is a flowchart showing a defocus amount computation method according to the first embodiment.

Next, the defocus amount computation processing to be performed by the AF unit 42 in step S504 of FIG. 5 will be further explained with reference to a flowchart shown in FIG. 6. In step S5041, the AF unit 42 performs correlation calculation of the A image and GA image generated from the same pixel row (assumed to be the mth row). A correlation amount COR1($k$) used for correlation calculation can be computed according to, for example, equation (1):

$$COR1(k) = \sum_{i=1}^{N-1-2 \times K_{max}} |A(m, i-k) - GA(m, i+k)| \ (-k\max \leq k \leq k\max) \quad (1)$$

The variable k used in equation (1) is a shift amount at the time of correlation calculation and is an integer of –kmax (inclusive) to kmax (inclusive). The AF unit 42 obtains the correlation amount COR1($k$) for each shift amount k, and then obtains a value of the shift amount k in which the correlation between the A image and the GA image becomes highest, that is, the shift amount k in which the correlation amount COR1 becomes minimum. Note that the shift amount k at the time of computing the correlation amount COR1($k$) is an integer. However, when obtaining the shift amount k in which the correlation amount COR1($k$) becomes minimum, interpolation processing is properly performed to obtain a value (real value) in the subpixel unit in order to improve the accuracy of the defocus amount.

In this embodiment, a shift amount dk in which the sign of the difference value of the correlation amount COR1 changes is computed as the shift amount k in which the correlation amount COR1($k$) becomes minimum.

First, the AF unit 42 computes a difference value DCOR1 between correlation amounts:

$$DCOR1(k) = COR1(k) - COR1(k-1) \quad (2)$$

Then, by using the difference value DCOR1 between correlation amounts, the AF unit 42 obtains a shift amount dk1 in which the sign of the difference amount changes. Letting k1 be a k value immediately before the sign of the difference amount changes, and k2 (k2=k1+1) be a k value after the sign changes, the AF unit 42 computes the shift amount dk1:

$$dk1 = k1 + |DCOR1(k1)|/|DCOR1(k1) - DCOR1(k2)| \quad (3)$$

In this fashion, the AF unit 42 computes, in the subpixel unit, the shift amount dk1 in which the correlation amount between the A image and the GA image becomes maximum, and ends the processing in step S5041. Note that the method of computing a phase difference between two one-dimensional image signals is not limited to one described here, and an arbitrary known method is usable.

In step S5042, for the B image and GB image generated from the same pixel row ((m+1)th row), the AF unit 42 computes a shift amount dk2 in which the correlation becomes maximum, by the same method as that in step S5041.

In step S5043, the AF unit 42 computes a sum dk_sum of the two types of shift amounts dk1 and dk2 (i.e., dk_sum=dk1+dk2). The sum dk_sum is equivalent to the phase difference between the A image and the B image, as described above. The AF unit 42 multiplies the sum dk_sum of the shift amounts by a sensitivity stored in advance in, for example, the nonvolatile memory 56, thereby converting the sum dk_sum of the shift amounts into a defocus amount DEF. After the end of calculating the defocus amount DEF, the AF unit 42 ends the defocus amount computation processing.

In this embodiment, the A image and the B image, which are signals obtained by photoelectrically converting light fluxes passing through different areas on the exit pupil of the imaging optical system, are generated from pixel groups positioned apart from each other in a direction (Y-axis direction) perpendicular to the phase difference detection direction (X-axis direction). For this reason, the positions of object optical images sampled by the A image and B image are different, and it is not guaranteed that the degree of similarity between the A image and the B image is high. When obtaining a phase difference between two signals based on the correlation amount, if the degree of similarity between the two signals is high, a high-accuracy phase difference is obtained. In this embodiment, the GA image that can sample almost the same position as that of the A image on an object optical image is generated to compute a phase difference between the A image and the GA image. Further, a phase difference between the B image and the GB image is computed in the same way. By adding these two phase difference computation results, the phase difference between the A image and the B image can be computed at high accuracy.

Since the phase difference between the A image and the B image is computed by adding the phase difference between the A image and the GA image, and the phase difference between the B image and the GB image, the phase difference per unit defocus amount becomes larger than the phase difference between the A image and the GA image (or the B image and the GB image). Hence, the influence of noise contained in the phase difference detection result can be reduced to perform high-accuracy phase difference detection. As described above, the defocus amount detection accuracy depends on the interval between the barycentric positions, in the area on the exit pupil plane, of light fluxes for detecting a phase difference. In this embodiment, the sum of the phase difference between the A image and the GA image, and the phase difference between the B image and the GB image is obtained. As a result, high-accuracy focus detection can be implemented using the interval between the barycentric positions, in the area on the exit pupil plane, of a light flux for the A image and a light flux for the B image. However, the method of processing two phase difference results is not limited to the method of computing a sum. For example, the average value of the phase difference between the A image and the GA image, and the phase difference between the B image and the GB image may be used.

The average value is a value obtained by calculating the sum of the phase difference between the A image and the GA image, and the phase difference between the B image and the GB image, and dividing the sum by two. Essentially, this is equivalent to the use of the interval between the barycentric positions, in the area on the exit pupil plane, of a light flux for the A image and a light flux for the B image. High-accuracy focus detection can be implemented.

It is also possible to obtain the sum or average value of phase differences after each of the phase difference between the A image and the GA image, and the phase difference between the B image and the GB image is weighted in accordance with the reliability, light amount difference, or the like. For example, as the contrast or degree of similarity between paired images is higher, it can be determined that the reliability of the phase difference is higher. As for the light amount difference, for example, the integrated values of paired images can be compared. A highly reliable phase difference or a phase difference obtained from paired images having a small light amount difference is considered to be highly accurate. Thus, a larger weight can be applied to obtain an average value.

With this arrangement, even when the degree of similarity between the A image and the B image is low, the phase difference between the A image and the B image can be obtained at high accuracy. For this reason, the degree of freedom of the arrangement of a pixel group (first pixel group) for generating a signal of the A image, and a pixel group (second pixel group) for generating a signal of the B image is increased. The focus detection pixels can be arranged at positions where correction is easily performed when generating image capture signals. Accordingly, the correction accuracy of a pixel value corresponding to the focus detection pixel is increased, and high image quality can be implemented.

In this embodiment, the phase difference dk1 (first phase difference) obtained using the correlation amount between the A image and the GA image, and the phase difference dk2 (second phase difference) obtained using the correlation amount between the B image and the GB image are computed, and the sum of the phase differences dk1 and dk2 is converted into a defocus amount. However, the defocus amount computation method is not limited to this. For example, it is also possible to compute the sum of the correlation amount (first correlation amount) between the A image and the GA image, and the correlation amount (second correlation amount) between the B image and the GB image, which correspond to the same shift amount k, and compute a defocus amount from the shift amount dk in which the sum of the two correlation amounts becomes minimum. In this case, the phase difference detected from the A image and the B image is decreased, but the difference between correlation amounts can be increased and the shift amount detection accuracy is improved.

When computing a defocus amount from a shift amount, the sum of the phase differences dk1 and dk2 is multiplied by the sensitivity. However, the defocus amount may also be computed by storing in advance sensitivities for the phase difference dk1 and the phase difference dk2 in the nonvolatile memory 56, multiplying the respective phase differences by the sensitivities, and then adding the resultant phase differences. Although the capacity necessary to store sensitivities increases, higher-accuracy focus detection can be performed.

(Modification)

In the above description, the focus detection photoelectric conversion units 311a and 311b of two types are arranged by localizing them in lateral directions (right direction and left direction) from the centers of pixels, and light fluxes that divide the exit pupil of the imaging optical system into roughly two are received, thereby implementing phase difference detection. However, the photoelectric conversion units of the focus detection pixels may be configured to receive light fluxes by dividing the exit pupil into three or more. By increasing the division count, the influence of an eclipse on a light flux used for focus detection can be suppressed to perform higher-accuracy focus detection. When the distance from the image sensor to the exit pupil of the imaging optical system in the optical axis direction does not coincide with the distance from the image sensor to the incident pupil of the on-chip microlens on the image sensor, an eclipse is generated in a light flux entering a focus detection area corresponding to a large image height. No eclipse is generated in a light flux entering the focus detection area 401 set at almost the center of the shooting range 400, as shown in FIG. 4A. However, when the focus detection area exists in an area spaced apart from the intersection point between the optical axis and the image sensor, an eclipse is generated in an incident light flux.

Figure 10A:
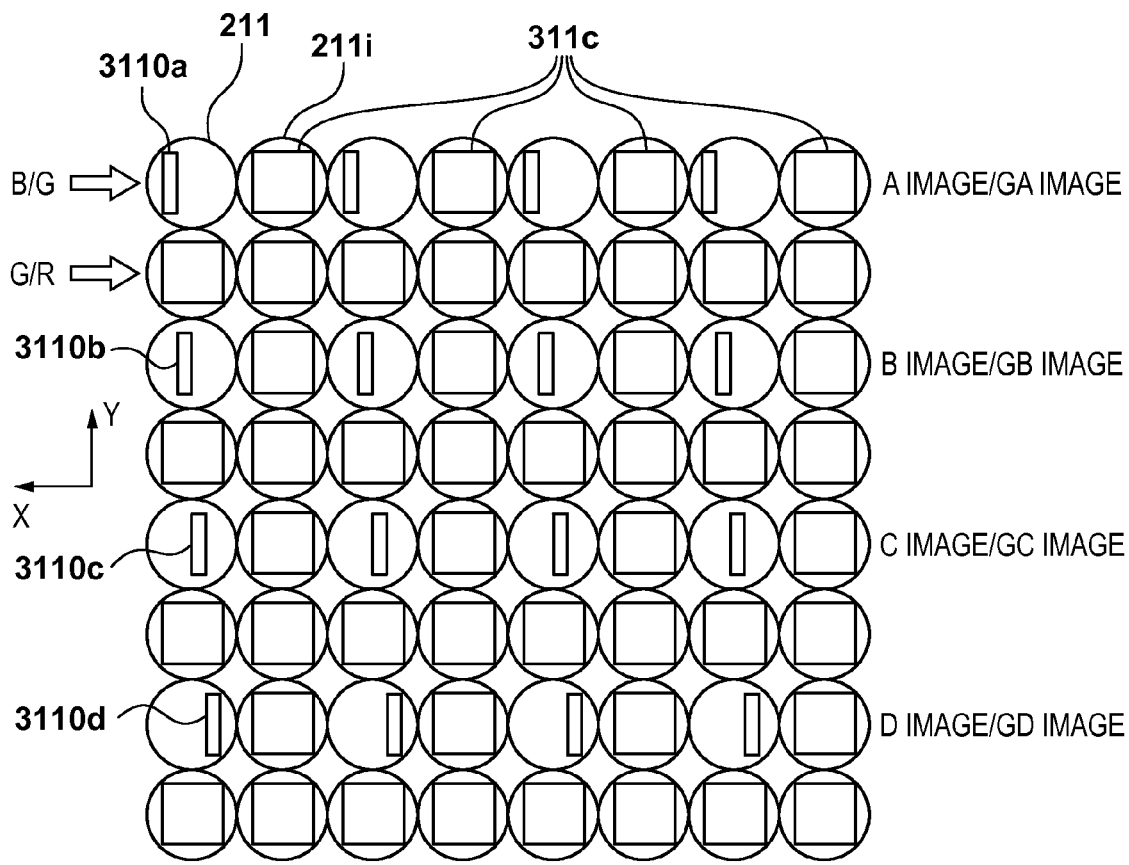
FIGS. 10A and 10B are views showing an example of the arrangement of an image sensor according to a modification of the first embodiment.

As in FIG. 2A, FIG. 10A schematically shows an example of the pixel array of the image sensor 14 having an arrangement in which a focus detection photoelectric conversion unit is divided into four. Referring to FIG. 10A, focus detection photoelectric conversion units 3110a, 3110b, 3110c, and 3110d are arranged by localizing them in lateral directions from the centers of pixels. An A image is an image signal organized by concatenating outputs from the plurality of photoelectric conversion units 3110a. A B image, C image, and D image are image signals similarly obtained for the photoelectric conversion units 3110b, 3110c, and 3110d. A GA image, GB image, GC image, and GD image are image signals organized by concatenating outputs from the photoelectric conversion units 311c of pixels adjacent to the focus detection pixels. Since FIG. 10A shows an example of the array of focus detection pixels corresponding to a division count of 3 or more, a B/G pixel row does not include a pixel having a B filter. In practice, however, it is configured to include a B/G pixel row having no focus detection pixel, as shown in FIG. 2A.

All or selective ones of the phase difference between the A image and the GA image, the phase difference between the B image and the GB image, the phase difference between the C image and the GC image, and the phase difference between the D image and the GD image, which are obtained from the image sensor 14 having the arrangement as shown in FIG. 10A, can be used.

Figure 10B:
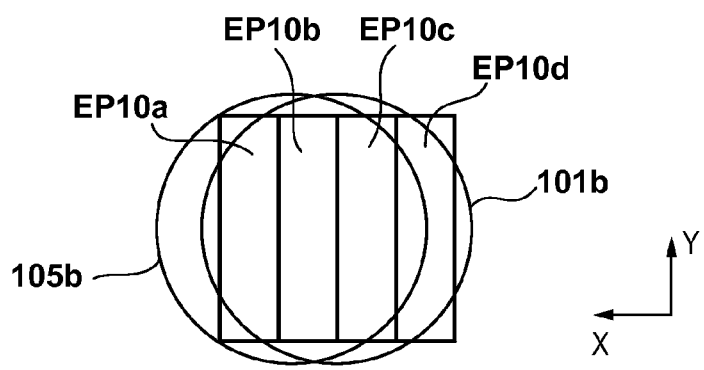

As in FIG. 3C, FIG. 10B shows projection images EP10a, EP10b, EP10c, and EP10d of the photoelectric conversion units 3110a, 3110b, 3110c, and 3110d on the exit pupil plane. Note that the projection image EP1c of the photoelectric conversion unit 311c is almost equal to the sum of EP10a, EP10b, EP10c, and EP10d. FIG. 10B shows even areas where eclipses by the lens barrel members are generated. Light entering an area falling in both circles 101b and 105b is not influenced by the eclipse generated by the lens barrel members 101b and 105b. However, an eclipse is generated in an incident light flux in an area outside at least one of the circles 101b and 105b.

For example, most of the projection image EP10d is positioned outside the circle 105b, so a light flux entering the photoelectric conversion unit 3110d is greatly influenced by an eclipse generated by the lens barrel member 105b, and an output from the photoelectric conversion unit 3110d is greatly decreased. Even if phase difference detection is performed in this state between the D image based on an output from the photoelectric conversion unit 3110d, and the GD image based on an output from the photoelectric conversion unit 311c that is almost equal in magnitude to the sum of EP10a to EP10d, no high-accuracy detection result can be expected. In this case, phase difference detection is performed by combining the phase difference between the A image and the GA image, the phase difference between the B image and the GB image, and the phase difference between the C image and the GC image, which are hardly influenced by an eclipse. Therefore, a high-accuracy phase difference detection result almost free from noise can be obtained.

When the image sensor 14 has an arrangement in which a light flux passing through the exit pupil is divided into four, as shown in FIGS. 10A and 10B, phase differences obtained from four pairs of image signals (A/GA, B/GB, C/GC, and D/GD) for the same defocus amount are different. This is because the defocus amount detection accuracy depends on the interval between a barycentric position corresponding to each of the projection images EP10a to EP10d in the area on the exit pupil plane, and a barycentric position corresponding to the projection image EP1c in the area on the exit pupil plane. Thus, in this modification, the defocus amount is computed by applying a sensitivity corresponding to the interval between barycentric positions to a phase difference result obtained from each pair of image signals.

In a situation in which no eclipse is generated in the focus detection photoelectric conversion units 3110a to 3110d, the results of phase differences between four pairs of image signals are used. The correlation amount calculation load may be decreased by reducing the number of image signal pairs used for phase difference detection such that the phase difference between the added image of the A image and B image, and the added image of the GA image and GB image is detected.

Second Embodiment

The second embodiment of the present invention will be described below. The second embodiment is mainly different from the first embodiment in the pixel array of an image sensor. The image sensor according to the first embodiment has an arrangement in which imaging pixels and two types of focus detection pixels are arrayed and one pixel has one photoelectric conversion unit. When the present invention is applied to an image capture apparatus using such an image sensor, the focus detection accuracy can be improved, as described in the first embodiment. However, the present invention is also applicable to an image capture apparatus using an image sensor in which two photoelectric conversion units are arranged in each of all pixels and output signals of the A image and B image can be obtained from all the pixels.

Note that the arrangement (FIG. 1) of the image capture apparatus, the focus detection area (FIG. 4A), and the focus adjustment operation and defocus amount computation processing (FIGS. 5 and 6), which have been described in the first embodiment, also apply to the second embodiment, and a description thereof will not be repeated.

The arrangement of an image sensor 14 according to this embodiment will be described with reference to FIGS. 7A to 8B. In FIGS. 7A to 8B, the same reference numerals as those in FIGS. 2A to 3C denote the same parts, and a repetitive description thereof will be omitted.

Figure 7A:
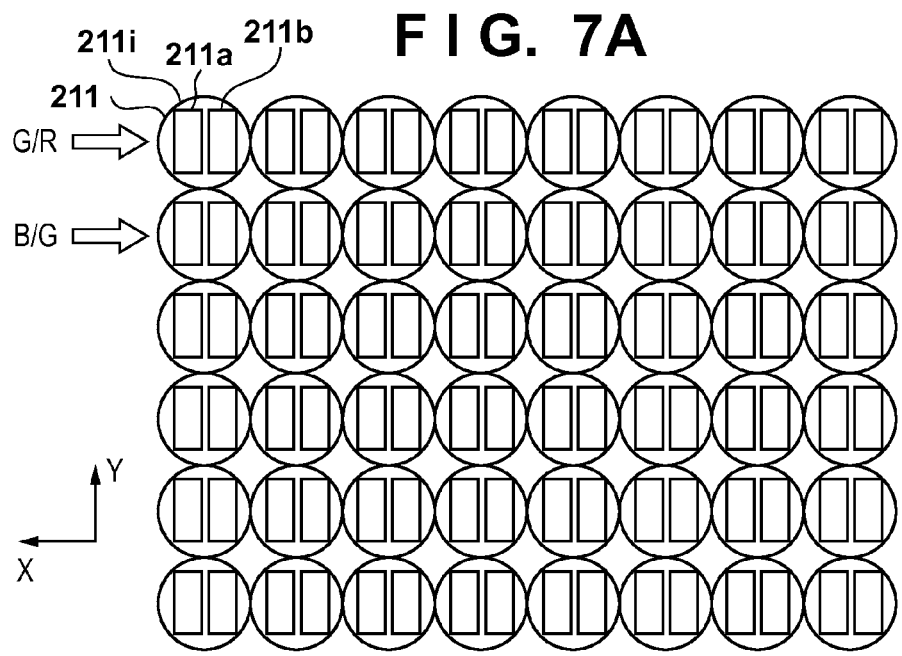
FIGS. 7A and 7B are views showing an example of the arrangement of an image sensor according to the second embodiment.

As in FIG. 2A, FIG. 7A shows a state in which a range of 6 rows in the longitudinal direction (Y-axis direction)×8 columns in the lateral direction (X-axis direction), out of pixels two-dimensionally arranged on the image sensor 14 according to this embodiment, is observed from an imaging lens 300. In the image sensor 14 according to this embodiment, color filters are arrayed in a Bayer pattern. More specifically, blue color filters are arranged in pixels at blue positions, unlike the first embodiment. In the second embodiment, the A (B) image and the GA (GB) image are obtained from the same pixels, so the color of the filter need not be changed.

In this embodiment, all pixels 211 include photoelectric conversion units 211a and 211b divided into two in the X-axis direction, and are configured to be able to separately read out an output signal from one photoelectric conversion unit, and the sum of output signals from the two photoelectric conversion units. A signal equivalent to an output signal from the other photoelectric conversion unit can be obtained as a difference between the sum of output signals from the two photoelectric conversion units, and an output signal from one photoelectric conversion unit. Output signals from the divided photoelectric conversion units can be used for phase-difference detection type focus detection by a method to be described later, and can also be used to generate a 3D (3-Dimensional) image constituted by a pair of parallax images. To the contrary, the sum of output signals from the two photoelectric conversion units can be used as an output signal from an imaging pixel.

Generation of image signals used for phase-difference detection type focus detection will be explained here. In this embodiment, the exit pupil of the imaging lens 300 is divided by a microlens 211i in FIG. 7A and the divided photoelectric conversion units 211a and 211b. An A image is an image signal organized by concatenating outputs from the photoelectric conversion units 211a in the plurality of pixels 211 arranged on the same pixel row (X-axis direction) in the focus detection area. A B image is an image signal organized by concatenating outputs from the photoelectric conversion units 211b. As described above, the image sensor according to this embodiment cannot directly read out an output from one of the two photoelectric conversion units. Hence, an image signal requiring an output signal from the photoelectric conversion unit that cannot be directly read out can be obtained as a difference between the sum of output signals from the two photoelectric conversion units, and an output signal from the photoelectric conversion unit that can be directly read out.

In this embodiment, a GA image and a GB image are generated from the sum of output signals from the two photoelectric conversion units that are read out from pixels used to generate the A image and the B image.

The focus difference, that is, defocus amount of the focus detection area can be detected by detecting, by correlation calculation, a relative phase difference between the A image and the GA image generated in this manner, and a relative phase difference between the B image and the GB image. The basic method is the same as that described in the first embodiment.

A plurality of pixels of which the photoelectric conversion units 211a used to generate the A image (first image signal) will be referred to as the first pixel group. A plurality of pixels of which the photoelectric conversion units 211b used to generate the B image (second image signal) will be referred to as the second pixel group. In this embodiment, the first pixel group is also used to generate the GA image (third image signal), and the second pixel group is also used to generate the GB image (fourth image signal).

Figure 7B:
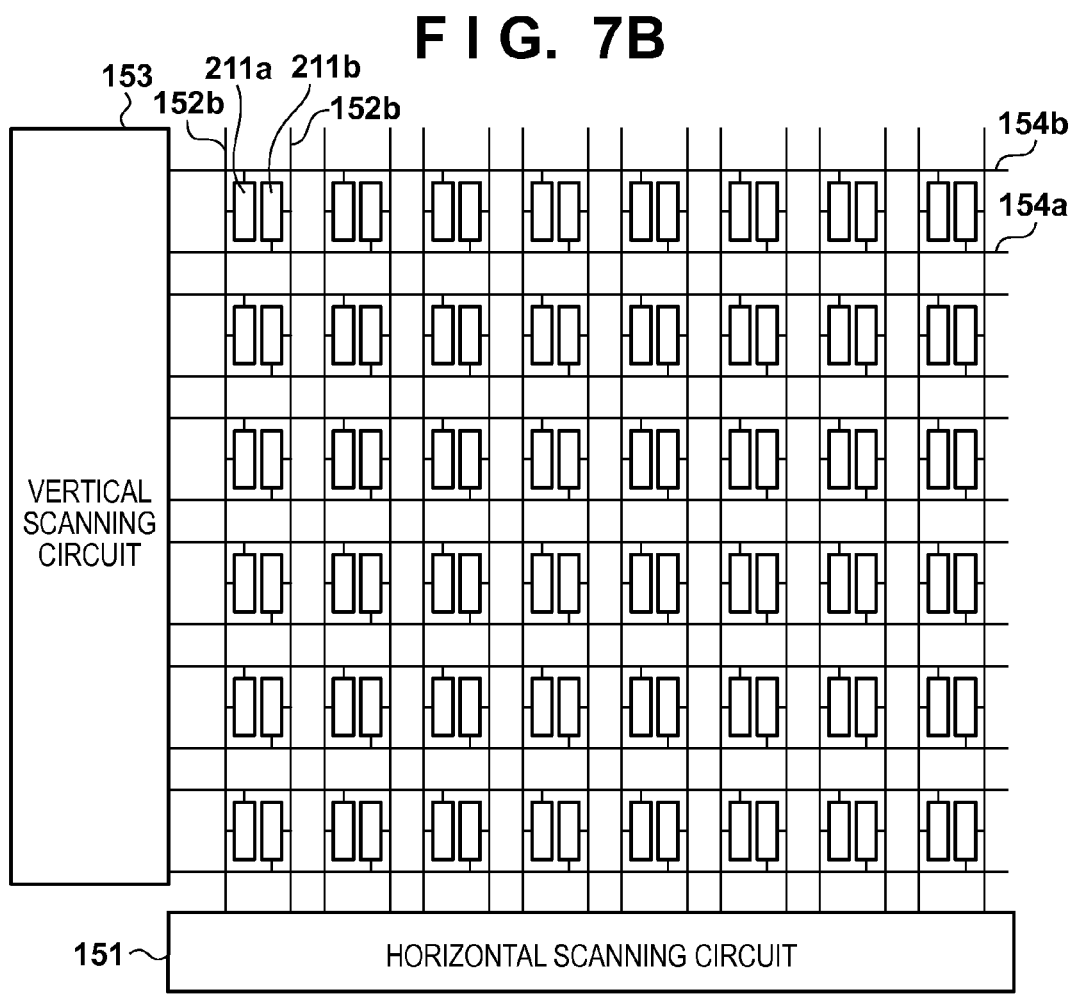

FIG. 7B is a view showing an example of the arrangement of a readout circuit in the image sensor 14 according to this embodiment. The image sensor 14 includes a horizontal scanning circuit 151 and a vertical scanning circuit 153, and horizontal scanning lines 152a and 152b and vertical scanning lines 154a and 154b are arranged at boundaries between respective pixels. An output from one of the photoelectric conversion units and an added output from the two photoelectric conversion units are externally read out via these scanning lines.

This embodiment assumes that the outputs of the A image and GA image are read out from pixels on odd-numbered rows, and the outputs of the B image and GB image are read out from pixels on even-numbered rows.

Figure 8A:
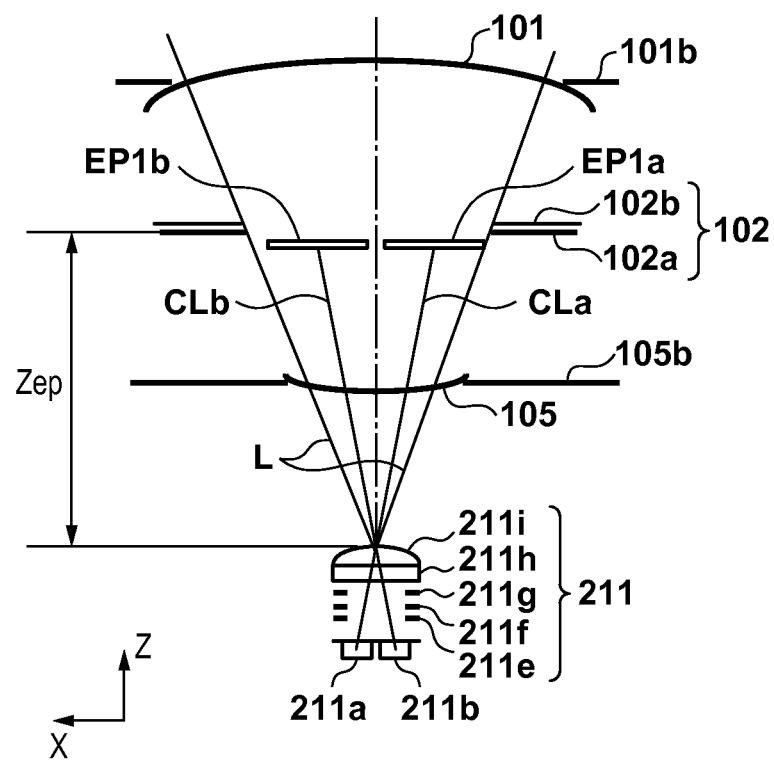
FIGS. 8A and 8B are views showing the relationship between the photoelectric conversion unit and the exit pupil according to the second embodiment.
Figure 8B:
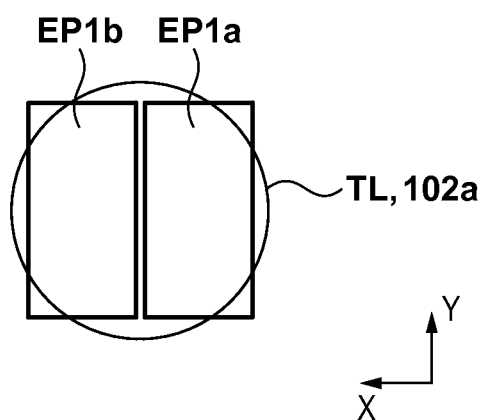

FIGS. 8A and 8B are views for explaining the conjugate relationship between the exit pupil plane of the imaging lens 300 and the photoelectric conversion units 211a and 211b of the pixel 211 arranged near the center of the image plane of the image sensor 14. The photoelectric conversion units 211a and 211b in the pixel 211, and the exit pupil plane of the imaging lens 300 are designed to have a conjugate relationship by the on-chip microlens 211i. The arrangement according to the second embodiment is the same as that according to the first embodiment except that each pixel has both the arrangements shown in FIGS. 3A and 3B, so a repetitive description thereof will be omitted.

Next, a phase-difference detection type focus detection method using an output from the image sensor 14 according to this embodiment will be explained. In the second embodiment, as in the first embodiment, phase differences are detected for respective combinations of the A and GA images and the B and GB images. In this embodiment, the GA image (i.e., a captured image signal of a GA imaging pixel) that is the sum of outputs from the photoelectric conversion units 211a and 211b, and the A image that is an output from the photoelectric conversion unit 211a are read out from an odd-numbered pixel row. The GB image (i.e., a captured image signal of a GB imaging pixel) that is the sum of outputs from the photoelectric conversion units 211a and 211b, and the B image that is an output from the photoelectric conversion unit 211b are read out from an even-numbered pixel row.

The B image on the odd-numbered pixel row and the A image on the even-numbered pixel row can be computed as the difference between the GA image and the A image, and the difference between the GB image and the B image, respectively. However, this requires calculation, so the S/N ratio of the obtained signal becomes lower than that in the case of direct readout. To perform high-accuracy phase difference detection, it is desirable not to use an image signal obtained as a difference. Hence, in this embodiment, the phase difference is detected using an output from one photoelectric conversion unit capable of readout, and the sum of outputs from the two photoelectric conversion units.

Figure 4C:
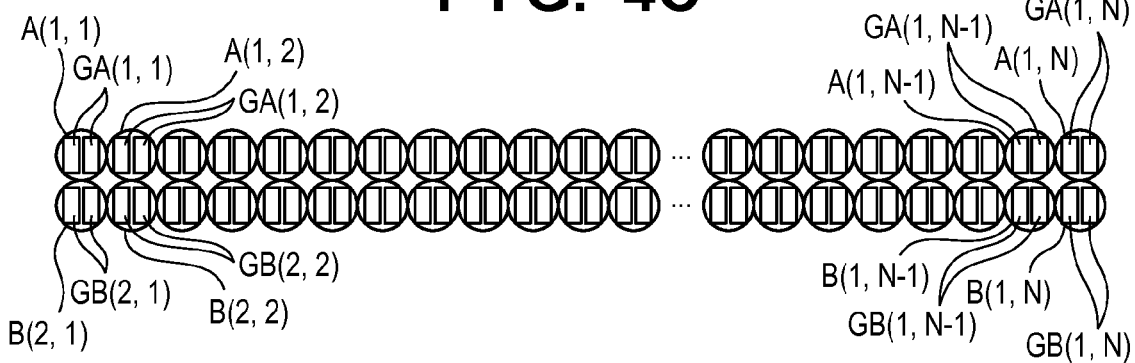

Unlike the first embodiment, a captured image signal (i.e., an output of an imaging pixel) and one image signal for AF are obtained from the same pixel. As shown in FIG. 4C, the A image (A(i, j)), the B image (B(i, j)), the GA image (GA(i, j)), and the GB image (GB(i, j)) ($1 \le i \le 2$, $1 \le j \le N$) can be obtained from pixels of 2 rows×N columns arranged in a focus detection area 401. As in the first embodiment, shift amounts dk1 and dk2 are obtained for respective combinations of the A and GA images and the B and GB images, and the defocus amount is obtained based on the sum dk_sm of the shift amounts dk1 and dk2.

According to the second embodiment, when the image sensor having the arrangement in which the photoelectric conversion unit of each pixel is divided is used, high-accuracy phase difference detection can be performed to improve the focus detection accuracy while reducing the processing load much more than in individual readout of each photoelectric conversion unit.

Third Embodiment

The third embodiment of the present invention will be described below. The third embodiment is mainly different from the first embodiment in the defocus amount computation method. In the first embodiment, the defocus amount is computed using the phase difference detection result of the A image and GA image and the phase difference detection result of the B image and GB image. Even if pixels used to generate the A image and pixels used to generate the B image are spaced apart from each other, high-accuracy defocus amount detection is implemented. However, when the defocus amount is large, the way of blurring is different between the A image and the GA image (image capture signal), and the coincidence between the two image signals decreases. This is because the f-numbers of light fluxes contained in the two image signals are different owing to differences in size and arrangement between photoelectric conversion units used to generate the respective image signals. As the defocus amount increases, the focus detection accuracy degrades.

A feature of this embodiment is to use the phase difference detection result of the A image and B image when the defocus amount is estimated to be large. This is because, when the defocus amount is large, even if pixels used to generate the A image and pixels used to generate the B image are spaced apart from each other, the blur of the object optical image is large and the coincidence between the A image and the B image is increased. In other words, this embodiment utilizes the fact that, when the defocus amount is large, the difference between the sampling positions of the A image and B image has little influence on the focus detection result.

Note that the arrangement (FIG. 1) of the image capture apparatus, the arrangement of an image sensor 14 (FIGS. 2A and 2B and FIGS. 3A to 3C), the focus detection area (FIG. 4A), and the focus adjustment operation (FIG. 5), which have been described in the first embodiment, also apply to the third embodiment, and a description thereof will not be repeated.

Figure 9:
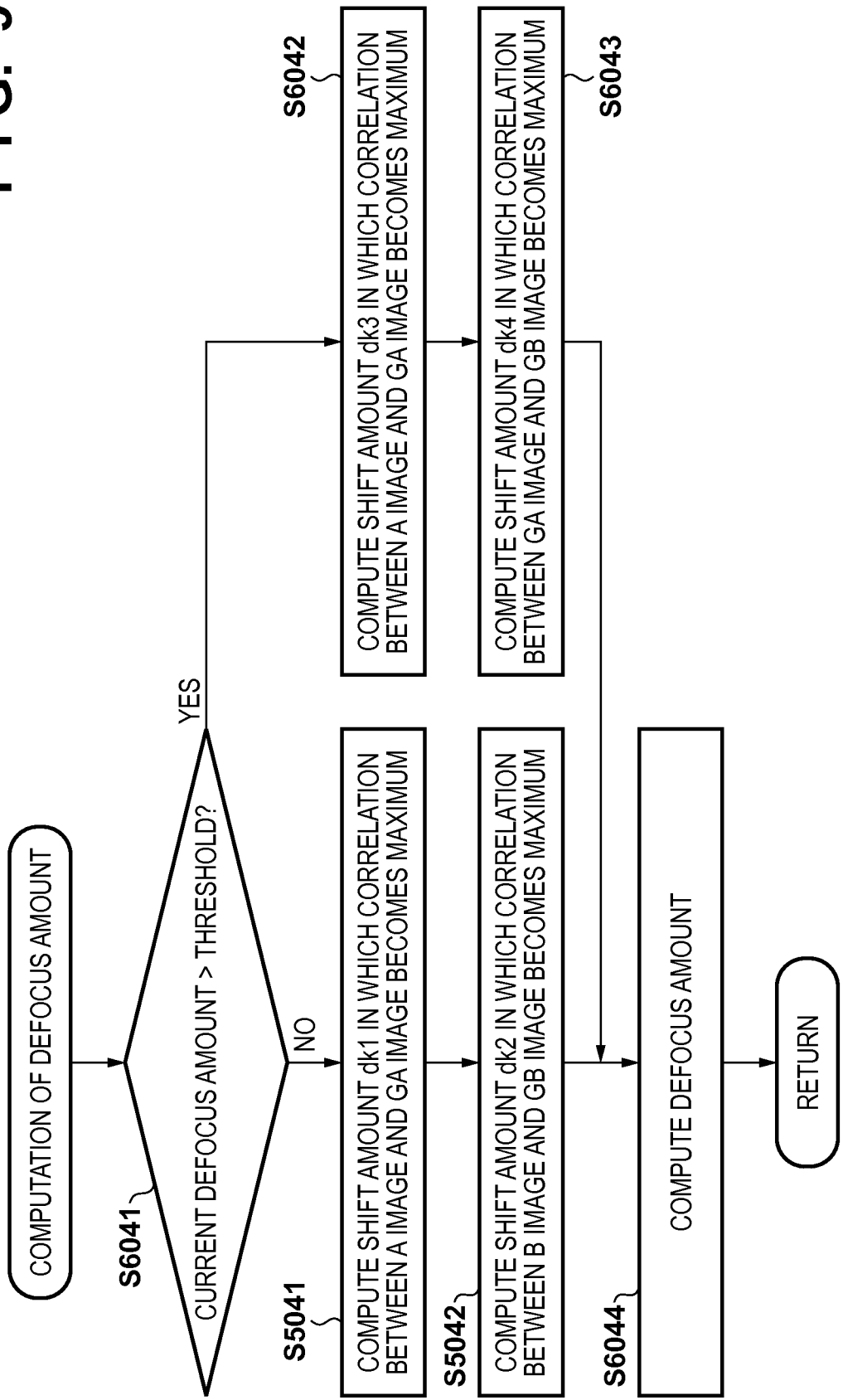
FIG. 9 is a flowchart showing a defocus amount computation method according to the third embodiment.

A defocus amount computation method according to the third embodiment will be explained with reference to a flowchart shown in FIG. 9. This defocus amount computation processing can be executed in step S504 of FIG. 5. In FIG. 9, the same reference numerals as those in FIG. 6 denote the same operations as those in the first embodiment.

In step S6041, an AF unit 42 determines whether the current defocus amount is larger than a predetermined threshold. A defocus amount at the present time is an estimated value that can be computed from a defocus amount obtained before the start of the focus adjustment operation, or when focus detection is repetitively performed, a previously detected defocus amount and a subsequent lens driving amount or the like. When obtaining a defocus amount before the start of the focus adjustment operation, focus detection may be performed at a predetermined interval before the condition to start focus detection is satisfied in step S501 of FIG. 5. Note that the threshold used here can be determined in advance through experiments or the like.

If the AF unit 42 determines that the current defocus amount is larger than the predetermined threshold, it advances the process to step S6042. If the AF unit 42 determines that the current defocus amount is equal to or smaller than the predetermined threshold, it executes steps S5041 and S5042 to obtain shift amounts dk1 and dk2, as in the first embodiment, and advances the process to step S6044.

In step S6042, the AF unit 42 performs correlation calculation using the A image and the B image obtained from focus detection pixels (first pixel group and second pixel group) present on different pixel rows. The correlation calculation can be executed using, as the B image, the GA image in correlation calculation between the A image and the GA image, which have been described in the first embodiment. Based on a difference DCOR3 between correlation amounts, the AF unit 42 computes a shift amount dk3 in which the correlation amount (to be referred to as COR3) becomes minimum, as in the first embodiment.

Then, in step S6043, the AF unit 42 performs correlation calculation using the GA image obtained from the same pixel row as that of the A image, and the GB image obtained from the same pixel row as that of the B image. Based on a difference DCOR4 between correlation amounts, the AF unit 42 computes a shift amount dk4 in which the correlation amount (to be referred to as COR4) becomes minimum, as in step S6042. After that, the AF unit 42 advances the process to step S6044.

In step S6044, the AF unit 42 computes a defocus amount. If the shift amounts dk1 and dk2 have been computed, the AF unit 42 computes a sum dk_sum of the shift amounts dk1 and dk2, and multiplies it by a sensitivity stored in advance in a nonvolatile memory 56, thereby converting the shift amount into a defocus amount DEF, as in the first embodiment.

In contrast, if the shift amounts dk3 and dk4 have been computed, the AF unit 42 computes a difference dk_dif=dk3−dk4 between the shift amounts dk3 and dk4, and multiplies it by a sensitivity stored in advance in the nonvolatile memory 56, thereby converting the shift amount into the defocus amount DEF.

After the end of computing the defocus amount DEF, the AF unit 42 ends the defocus amount computation subroutine.

The reason why the shift amount dk4 is subtracted from the shift amount dk3 will be explained. The shift amount dk3 is a shift amount between the A image and the B image. The first pixel group for generating the A image, and the second pixel group for generating the B image are spaced apart from each other in a direction (Y-axis direction) perpendicular to a direction (X-axis direction in this case) in which a phase difference is detected. Thus, the position at which an object optical image is sampled is different. When focus detection is performed for an object having an edge at which the contrast (brightness difference) exists in the oblique direction, a phase difference irrelevant to the defocus amount is generated as a focus detection error between the A image and the B image. This focus detection error is also generated between the GA image and the GB image for the same reason. However, the phase difference (shift amount dk4) between the GA image and the GB image is neither increased nor decreased by the defocus amount. By utilizing this fact, dk4 can be subtracted from dk3 to reduce a focus detection error generated depending on an object.

As described above, according to the third embodiment, a focus detection result suited to the defocus amount can be obtained by changing a pair of image signals to undergo correlation calculation in accordance with the defocus amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-063561, filed on Mar. 26, 2014 and 2015-003611, filed on Jan. 9, 2015 which are hereby incorporated by reference herein in their entirety.

What is claimed is:

1. A focus detection apparatus comprising:
   a first pixel configured to detect a light flux having passed through a partial area of an exit pupil of an imaging optical system;
   a second pixel configured to detect a light flux having passed through a partial area of the exit pupil of the imaging optical system that is different from the area through which the light flux detected by said first pixel has passed;
   a third pixel configured to detect a light flux having passed through an entire area of the exit pupil of the imaging optical system;
   a fourth pixel arranged at a position different from said third pixel and configured to detect a light flux having passed through the entire area of the exit pupil of the imaging optical system;
   a first computation unit configured to compute a first phase difference between a first image signal output from said first pixel, and a second image signal output from said third pixel;
   a second computation unit configured to compute a second phase difference between a third image signal output from said second pixel, and a fourth image signal output from said fourth pixel; and
   a defocus amount computation unit configured to compute a defocus amount of the imaging optical system by using a sum of the first phase difference and the second phase difference.

2. The apparatus according to claim 1, wherein said first pixel and said second pixel are spaced apart from each other in a direction perpendicular to a direction in which the first phase difference and the second phase difference are detected.

3. The apparatus according to claim 2, wherein
   a distance between said first pixel and said third pixel in the perpendicular direction is smaller than a distance between said first pixel and said second pixel in the perpendicular direction, and a distance between said second pixel and said fourth pixel in the perpendicular direction is smaller than the distance between said first pixel and said second pixel in the perpendicular direction.

4. The apparatus according to claim 3, wherein said first pixel and said third pixel are adjacent pixels, and said second pixel and said fourth pixel are adjacent pixels.

5. The apparatus according to claim 1, wherein each of the second image signal and the fourth image signal is generated based on a plurality of pixel values.

6. The apparatus according to claim 1, further comprising:
a third computation unit configured to detect a third phase difference between the first image signal and the third image signal; and
a fourth computation unit configured to detect a fourth phase difference between the second image signal and the fourth image signal,
wherein when a current defocus amount is larger than a predetermined threshold, said defocus amount computation unit computes the defocus amount of the imaging optical system based on a difference between the third phase difference and the fourth phase difference, and
when the current defocus amount is not larger than the predetermined threshold, said defocus amount computation unit computes the defocus amount of the imaging optical system based on a sum of the first phase difference and the second phase difference.

7. A focus detection apparatus comprising:
a first pixel configured to detect a light flux having passed through a partial area of an exit pupil of an imaging optical system;
a second pixel configured to detect a light flux having passed through a partial area of the exit pupil of the imaging optical system that is different from the area through which the light flux detected by said first pixel has passed;
a third pixel arranged at a position closer to said first pixel than said second pixel and configured to detect a light flux having passed through an entire area of the exit pupil of the imaging optical system;
a fourth pixel arranged at a position closer to said second pixel than said first pixel and configured to detect a light flux having passed through the entire area of the exit pupil of the imaging optical system;
a first computation unit configured to compute a first phase difference between a first image signal output from said first pixel, and a second image signal output from said third pixel;
a second computation unit configured to compute a second phase difference between a third image signal output from said second pixel, and a fourth image signal output from said fourth pixel; and
a defocus amount computation unit configured to compute a defocus amount of the imaging optical system by using a sum of the first phase difference and the second phase difference.

8. A focus detection apparatus comprising:
a first pixel configured to detect a light flux having passed through an exit pupil of an imaging optical system, a barycentric position of a projection image of a pixel that is projected on the exit pupil being shifted from a barycentric position of the exit pupil in a first direction perpendicular to an optical axis;
a second pixel configured to detect a light flux having passed through the exit pupil of the imaging optical system, a barycentric position of a projection image of a pixel that is projected on the exit pupil being shifted from the barycentric position of the exit pupil in a direction opposite to the first direction;
a third pixel configured to detect a light flux having passed through the exit pupil of the imaging optical system, a barycentric position of a projection image of a pixel that is projected on the exit pupil being positioned at the barycentric position of the exit pupil;
a fourth pixel arranged at a position different from said third pixel and configured to detect a light flux having passed through the exit pupil of the imaging optical system, a barycentric position of a projection image of a pixel that is projected on the exit pupil being positioned at the barycentric position of the exit pupil;
a first computation unit configured to compute a first phase difference between a first image signal output from said first pixel, and a second image signal output from said third pixel;
a second computation unit configured to compute a second phase difference between a third image signal output from said second pixel, and a fourth image signal output from said fourth pixel; and
a defocus amount computation unit configured to compute a defocus amount of the imaging optical system by using a sum of the first phase difference and the second phase difference.

9. A focus detection apparatus control method comprising:
a first detection step of detecting a light flux having passed through a partial area of an exit pupil of an imaging optical system;
a second detection step of detecting a light flux having passed through a partial area of the exit pupil of the imaging optical system that is different from the area through which the light flux detected in the first detection step;
a third detection step of detecting a light flux having passed through an entire area of the exit pupil of the imaging optical system;
a fourth detection step of detecting, at a position different from a position at which the third detection step detects the light flux, a light flux having passed through the entire area of the exit pupil of the imaging optical system;
a first computation step of computing a first phase difference between a first image signal obtained in the first detection step, and a second image signal obtained in the third detection step;
a second computation step of computing a second phase difference between a third image signal obtained in the second detection step, and a fourth image signal obtained in the fourth detection step; and
a defocus amount computation step of computing a defocus amount of the imaging optical system by using a sum of the first phase difference and the second phase difference.

10. The method according to claim 9, wherein
the first detection step uses an output from a first pixel, and
the second detection step uses an output from a second pixel spaced apart from the first pixel in a direction perpendicular to a direction in which the first phase difference and the second phase difference are detected.

11. The method according to claim 10, wherein
the third detection step uses an output from a third pixel,
the fourth detection step uses an output from a fourth pixel, a distance between the first pixel and the third pixel in the perpendicular direction is smaller than a distance between the first pixel and the second pixel in the perpendicular direction, and a distance between the second pixel and the fourth pixel in the perpendicular direction is smaller than the distance between the first pixel and the second pixel in the perpendicular direction.

12. The method according to claim 11, wherein the first pixel and the third pixel are adjacent pixels, and the second pixel and the fourth pixel are adjacent pixels.

13. The method according to claim 9, wherein each of the second image signal and the fourth image signal is generated based on a plurality of pixel values.

14. The method according to claim 9, further comprising:
a third computation step of detecting a third phase difference between the first image signal and the third image signal; and
a fourth computation step of detecting a fourth phase difference between the second image signal and the fourth image signal,
wherein the defocus amount computation step includes:
a step of, when a current defocus amount is larger than a predetermined threshold, computing the defocus amount of the imaging optical system based on a difference between the third phase difference and the fourth phase difference, and
a step of, when the current defocus amount is not larger than the predetermined threshold, computing the defocus amount of the imaging optical system based on a sum of the first phase difference and the second phase difference.

15. A focus detection apparatus control method comprising:
a first detection step of detecting a light flux having passed through a partial area of an exit pupil of an imaging optical system;
a second detection step of detecting a light flux having passed through a partial area of the exit pupil of the imaging optical system that is different from the area through which the light flux detected in the first detection step has passed;
a third detection step of detecting, at a position, a distance from which to a position at which the first detection step detects the light flux is shorter than that to a position at which the second detection step detects the light flux, a light flux having passed through an entire area of the exit pupil of the imaging optical system, the third detection step being arranged at a position closer to the first detection step than the second detection step;
a fourth detection step of detecting, at a position, a distance from which to a position at which the second detection step detects the light flux is shorter than that to a position at which the first detection step detects the light flux, a light flux having passed through the entire area of the exit pupil of the imaging optical system, the fourth detection step being arranged at a position closer to the second detection step than the first detection step;
a first computation step of computing a first phase difference between a first image signal obtained in the first detection step, and a second image signal obtained in the third detection step;
a second computation step of computing a second phase difference between a third image signal obtained in the second detection step, and a fourth image signal obtained in the fourth detection step; and
a defocus amount computation step of computing a defocus amount of the imaging optical system by using a sum of the first phase difference and the second phase difference.

16. A focus detection apparatus control method comprising:
a first computation step of computing a first phase difference between
a first image signal output from a first pixel configured to detect a light flux having passed through an exit pupil of an imaging optical system, a barycentric position of a projection image of a pixel that is projected on the exit pupil being shifted from a barycentric position of the exit pupil in a first direction perpendicular to an optical axis, and
a second image signal output from a third pixel configured to detect a light flux having passed through the exit pupil of the imaging optical system, a barycentric position of a projection image of a pixel that is projected on the exit pupil being positioned at the barycentric position of the exit pupil;
a second detection step of computing a second phase difference between
a third image signal output from a second pixel configured to detect a light flux having passed through the exit pupil of the imaging optical system, a barycentric position of a projection image of a pixel that is projected on the exit pupil being shifted from the barycentric position of the exit pupil in a direction opposite to the first direction, and
a fourth image signal output from a fourth pixel arranged at a position different from the third pixel and configured to detect a light flux having passed through the exit pupil of the imaging optical system, a barycentric position of a projection image of a pixel that is projected on the exit pupil being positioned at the barycentric position of the exit pupil; and
a defocus amount computation step of computing a defocus amount of the imaging optical system by using a sum of the first phase difference and the second phase difference.

* * * * *